United States Patent
Glaser et al.

(10) Patent No.: US 11,295,552 B2
(45) Date of Patent: *Apr. 5, 2022

(54) MOBILE USER INTERFACE EXTRACTION

(71) Applicant: Grabango Co., Berkeley, CA (US)

(72) Inventors: William Glaser, Berkeley, CA (US); Brian Van Osdol, Piedmont, CA (US)

(73) Assignee: Grabango Co., Berkeley, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 16/803,556

(22) Filed: Feb. 27, 2020

(65) Prior Publication Data
US 2020/0195462 A1 Jun. 18, 2020

Related U.S. Application Data

(63) Continuation of application No. 15/644,801, filed on Jul. 9, 2017, now Pat. No. 10,659,247.

(Continued)

(51) Int. Cl.
*G06V 40/20* (2022.01)
*G08B 13/196* (2006.01)
*H04N 5/225* (2006.01)
*H04N 7/18* (2006.01)
*H05B 47/19* (2020.01)
*H05B 47/125* (2020.01)

(Continued)

(52) U.S. Cl.
CPC .......... *G06V 40/20* (2022.01); *G06K 9/6232* (2013.01); *G06V 10/245* (2022.01); *G06V 10/40* (2022.01); *G06V 20/00* (2022.01); *G06V 20/52* (2022.01); *G06V 40/10* (2022.01); *G08B 13/196* (2013.01); *H04L 12/282* (2013.01); *H04L 12/2809* (2013.01); *H04L 12/2814* (2013.01); *H04L 67/12* (2013.01); *H04N 5/2252* (2013.01); *H04N 5/2257* (2013.01); *H04N 7/18* (2013.01); *H04N 7/183* (2013.01); *H05B 47/105* (2020.01); *H05B 47/125* (2020.01); *H05B 47/19* (2020.01); *G06V 20/63* (2022.01)

(58) Field of Classification Search
None
See application file for complete search history.

(56) References Cited

U.S. PATENT DOCUMENTS 5,254,853 A 10/1993 Reich
5,418,567 A 5/1995 Boers et al.
(Continued)

FOREIGN PATENT DOCUMENTS

BR 102016019151 A2 3/2018
WO 2019032304 A1 2/2019

OTHER PUBLICATIONS

Elizabeth Weise: "How Amazon's line-less grocery services might really work", USATODAY, Dec. 8, 2016 (Dec. 8, 2016), Retrieved from the Internet: URL: https://eu.usatoday.com/story/tech/news/2016/12/06/amazon-go-surveillance-cameras-shopping-grocery-supermarket/95055200/ [retrieved on Feb. 21, 2020] *the whole document*.

*Primary Examiner* — Delomia L Gilliard
(74) *Attorney, Agent, or Firm* — Alpine Patents LLC; Brian Van Osdol

(57) ABSTRACT

A system and method for extracting uncoupled information from a user interface output that includes collecting image data; processing the image data associated with the device interface source; and exposing the result to the extracted interface representation.

20 Claims, 31 Drawing Sheets

Related U.S. Application Data

(60) Provisional application No. 62/360,366, filed on Jul. 9, 2016, provisional application No. 62/360,369, filed on Jul. 9, 2016.

(51) Int. Cl.
*H05B 47/105* (2020.01)
*G06V 10/40* (2022.01)
*G06V 10/24* (2022.01)
*G06V 20/00* (2022.01)
*G06V 20/52* (2022.01)
*G06V 40/10* (2022.01)
*G06K 9/62* (2022.01)
*H04L 67/12* (2022.01)
*H04L 12/28* (2006.01)
*G06V 20/62* (2022.01)

(56) References Cited

U.S. PATENT DOCUMENTS

| | | |
|---|---|---|
| 5,502,564 A | 3/1996 | Ledger |
| 6,970,183 B1 | 11/2005 | Monroe |
| 6,996,460 B1 | 2/2006 | Krahnstoever et al. |
| 7,053,915 B1 | 5/2006 | Jung et al. |
| 7,195,157 B2 | 3/2007 | Swartz et al. |
| 7,225,414 B1 | 5/2007 | Sharma et al. |
| 7,227,976 B1 | 6/2007 | Jung et al. |
| 7,274,803 B1 | 9/2007 | Sharma et al. |
| 7,283,650 B1 | 10/2007 | Sharma et al. |
| 7,319,779 B1 | 1/2008 | Mummareddy et al. |
| 7,505,621 B1 | 3/2009 | Agrawal et al. |
| 7,590,261 B1 | 9/2009 | Mariano et al. |
| 7,711,155 B1 | 5/2010 | Sharma et al. |
| 7,734,070 B1 | 6/2010 | Sharma et al. |
| 7,848,548 B1 | 12/2010 | Moon et al. |
| 7,911,482 B1 | 3/2011 | Mariano et al. |
| 7,912,246 B1 | 3/2011 | Moon et al. |
| 7,921,036 B1 | 4/2011 | Sharma et al. |
| 7,930,204 B1 | 4/2011 | Sharma et al. |
| 7,957,565 B1 | 6/2011 | Sharma et al. |
| 7,974,869 B1 | 7/2011 | Sharma et al. |
| 7,987,111 B1 | 7/2011 | Sharma et al. |
| 8,009,863 B1 | 8/2011 | Sharma et al. |
| 8,010,402 B1 | 8/2011 | Sharma et al. |
| 8,027,521 B1 | 9/2011 | Moon et al. |
| 8,098,888 B1 | 1/2012 | Mummareddy et al. |
| 8,189,926 B2 | 5/2012 | Sharma et al. |
| 8,219,438 B1 | 7/2012 | Moon et al. |
| 8,254,633 B1 | 8/2012 | Moon et al. |
| 8,295,597 B1 | 10/2012 | Sharma et al. |
| 8,325,982 B1 | 12/2012 | Moon et al. |
| 8,351,647 B2 | 1/2013 | Sharma et al. |
| 8,379,937 B1 | 2/2013 | Moon et al. |
| 8,380,558 B1 | 2/2013 | Sharma et al. |
| 8,396,758 B2 | 3/2013 | Paradise et al. |
| 8,412,656 B1 | 4/2013 | Baboo et al. |
| 8,433,612 B1 | 4/2013 | Sharma et al. |
| 8,448,859 B2 | 5/2013 | Goncalves et al. |
| 8,520,906 B1 | 8/2013 | Moon et al. |
| 8,577,705 B1 | 11/2013 | Baboo et al. |
| 8,812,344 B1 | 8/2014 | Saurabh et al. |
| 9,120,621 B1 | 9/2015 | Curlander et al. |
| 9,141,931 B2 | 9/2015 | Ackerman |
| 9,161,084 B1 | 10/2015 | Sharma et al. |
| 9,262,681 B1 | 2/2016 | Mishra |
| 9,270,634 B1 | 2/2016 | Gu et al. |
| 9,317,785 B1 | 4/2016 | Moon et al. |
| 9,412,099 B1 | 8/2016 | Tyree |
| 9,426,720 B2 | 8/2016 | Cohn et al. |
| 9,474,934 B1 | 10/2016 | Krueger et al. |
| 9,740,977 B1 | 8/2017 | Moon et al. |
| 9,747,497 B1 | 8/2017 | Sharma et al. |
| 9,892,438 B1 | 2/2018 | Kundu et al. |
| 9,911,290 B1 | 3/2018 | Zalewski et al. |
| 9,948,902 B1 | 4/2018 | Trundle |
| 10,055,853 B1 | 8/2018 | Fisher et al. |
| 10,083,358 B1 | 9/2018 | Shin et al. |
| 10,127,438 B1 | 11/2018 | Fisher et al. |
| 10,133,933 B1 | 11/2018 | Fisher et al. |
| 10,134,004 B1 | 11/2018 | Liberato, Jr. et al. |
| 10,198,080 B1 | 2/2019 | Worley, III et al. |
| 10,198,625 B1 | 2/2019 | Shin et al. |
| 10,217,120 B1 | 2/2019 | Shin et al. |
| 10,262,331 B1 | 4/2019 | Sharma et al. |
| 10,282,621 B2 | 5/2019 | Glaser et al. |
| 10,296,936 B1 | 5/2019 | Saurabh et al. |
| 10,339,595 B2 | 7/2019 | Glaser et al. |
| 10,347,009 B1 | 7/2019 | Terven et al. |
| 10,354,262 B1 | 7/2019 | Hershey et al. |
| 10,387,896 B1 | 8/2019 | Hershey et al. |
| 10,474,858 B2 | 11/2019 | Davis et al. |
| 2001/0010541 A1 | 8/2001 | Fernandez et al. |
| 2002/0122559 A1 | 9/2002 | Fay et al. |
| 2003/0210340 A1 | 11/2003 | Romanowich |
| 2003/0216969 A1 | 11/2003 | Bauer et al. |
| 2004/0201754 A1 | 10/2004 | McAlister |
| 2004/0260513 A1 | 12/2004 | Fitzpatrick et al. |
| 2005/0096997 A1 | 5/2005 | Jain et al. |
| 2005/0189411 A1 | 9/2005 | Ostrowski et al. |
| 2006/0032915 A1 | 2/2006 | Schwartz |
| 2006/0147087 A1 | 7/2006 | Goncalves et al. |
| 2007/0091177 A1 | 4/2007 | West et al. |
| 2007/0146873 A1 | 6/2007 | Ortyn et al. |
| 2007/0242300 A1 | 10/2007 | Inai |
| 2007/0284440 A1 | 12/2007 | Birmingham et al. |
| 2008/0226129 A1 | 9/2008 | Kundu et al. |
| 2008/0228585 A1 | 9/2008 | Duri et al. |
| 2009/0195648 A1 | 8/2009 | Thomas et al. |
| 2010/0020173 A1 | 1/2010 | Marquart et al. |
| 2010/0255902 A1 | 10/2010 | Goldstein et al. |
| 2010/0280956 A1 | 11/2010 | Chutorash et al. |
| 2010/0295946 A1 | 11/2010 | Reed et al. |
| 2011/0122231 A1 | 5/2011 | Fujieda et al. |
| 2011/0215147 A1 | 9/2011 | Goncalves |
| 2012/0019168 A1 | 1/2012 | Noda et al. |
| 2012/0027297 A1 | 2/2012 | Feris et al. |
| 2012/0173351 A1 | 7/2012 | Hanson et al. |
| 2013/0103537 A1 | 4/2013 | Hewett |
| 2013/0147963 A1 | 6/2013 | Henninger et al. |
| 2013/0177201 A1 | 7/2013 | Fisher |
| 2013/0215116 A1 | 8/2013 | Siddique et al. |
| 2013/0223673 A1 | 8/2013 | Davis et al. |
| 2013/0284806 A1 | 10/2013 | Margalit |
| 2013/0290557 A1 | 10/2013 | Baratz |
| 2013/0317300 A1 | 11/2013 | Berci et al. |
| 2013/0335571 A1 | 12/2013 | Libal |
| 2013/0342688 A1 | 12/2013 | Siu |
| 2014/0082519 A1 | 3/2014 | Wang et al. |
| 2014/0082610 A1 | 3/2014 | Wang et al. |
| 2014/0129688 A1 | 5/2014 | Asenjo et al. |
| 2014/0245160 A1 | 8/2014 | Bauer et al. |
| 2014/0263631 A1 | 9/2014 | Muniz |
| 2014/0265880 A1 | 9/2014 | Taipale et al. |
| 2014/0272855 A1 | 9/2014 | Maser et al. |
| 2014/0279191 A1 | 9/2014 | Agarwal et al. |
| 2014/0285660 A1 | 9/2014 | Jamtgaard et al. |
| 2014/0297487 A1 | 10/2014 | Bashkin |
| 2014/0330408 A1 | 11/2014 | Rolley |
| 2014/0363059 A1 | 12/2014 | Hurewitz |
| 2014/0365334 A1 | 12/2014 | Hurewitz |
| 2014/0372957 A1 | 12/2014 | Keane et al. |
| 2015/0012396 A1 | 1/2015 | Puerini et al. |
| 2015/0019391 A1 | 1/2015 | Kumar et al. |
| 2015/0029339 A1 | 1/2015 | Kobres et al. |
| 2015/0039458 A1 | 2/2015 | Reid |
| 2015/0046213 A1 | 2/2015 | Doreswamy et al. |
| 2015/0077787 A1 | 3/2015 | Nishimura et al. |
| 2015/0077797 A1 | 3/2015 | Kurokawa |
| 2015/0088694 A1 | 3/2015 | Ackerman |
| 2015/0095189 A1 | 4/2015 | Dharssi et al. |
| 2015/0097961 A1 | 4/2015 | Ure et al. |
| 2015/0124973 A1 | 5/2015 | Arteaga et al. |
| 2015/0133190 A1 | 5/2015 | Fisher et al. |

(56) References Cited

U.S. PATENT DOCUMENTS

| | | |
|---|---|---|
| 2015/0138383 A1 | 5/2015 | Kelley et al. |
| 2015/0154973 A1 | 6/2015 | Mckenna et al. |
| 2015/0156332 A1 | 6/2015 | Kandregula |
| 2015/0163412 A1 | 6/2015 | Holley et al. |
| 2015/0227890 A1 | 8/2015 | Bednarek et al. |
| 2015/0244992 A1 | 8/2015 | Buehler |
| 2015/0310601 A1 | 10/2015 | Rodriguez et al. |
| 2015/0327045 A1 | 11/2015 | Chang et al. |
| 2015/0373509 A1 | 12/2015 | Wang et al. |
| 2016/0012379 A1 | 1/2016 | Iwai |
| 2016/0019514 A1 | 1/2016 | Landers et al. |
| 2016/0027262 A1 | 1/2016 | Skotty et al. |
| 2016/0037135 A1 | 2/2016 | McSheffrey et al. |
| 2016/0100086 A1 | 4/2016 | Chien |
| 2016/0110791 A1 | 4/2016 | Herring et al. |
| 2016/0112608 A1 | 4/2016 | Elensi et al. |
| 2016/0132854 A1 | 5/2016 | Singh |
| 2016/0173827 A1 | 6/2016 | Dannan et al. |
| 2016/0217388 A1 | 7/2016 | Okanohara et al. |
| 2016/0224856 A1 | 8/2016 | Park et al. |
| 2016/0242252 A1 | 8/2016 | Lim et al. |
| 2016/0254864 A1 | 9/2016 | Mueller et al. |
| 2016/0270191 A1 | 9/2016 | Ludwig, Jr. et al. |
| 2016/0282039 A1 | 9/2016 | Motukuri et al. |
| 2016/0289964 A1 | 10/2016 | Engberg |
| 2016/0321506 A1 | 11/2016 | Fridental et al. |
| 2016/0345414 A1 | 11/2016 | Nolan et al. |
| 2016/0358312 A1 | 12/2016 | Kolb et al. |
| 2017/0032182 A1 | 2/2017 | Motukuri et al. |
| 2017/0039613 A1 | 2/2017 | Kaehler et al. |
| 2017/0053171 A1 | 2/2017 | Buehler |
| 2017/0108236 A1 | 4/2017 | Guan et al. |
| 2017/0123030 A1 | 5/2017 | Hengerer et al. |
| 2017/0131781 A1 | 5/2017 | Buban |
| 2017/0161703 A1 | 6/2017 | Dodia |
| 2017/0169440 A1 | 6/2017 | Dey et al. |
| 2017/0178352 A1* | 6/2017 | Harmsen ................ G06T 17/05 |
| 2017/0188013 A1 | 6/2017 | Presler |
| 2017/0216667 A1 | 8/2017 | Garvey et al. |
| 2017/0278175 A1 | 9/2017 | Park et al. |
| 2017/0316656 A1 | 11/2017 | Chaubard et al. |
| 2017/0323376 A1 | 11/2017 | Glaser et al. |
| 2017/0332956 A1 | 11/2017 | Bigolin et al. |
| 2018/0005044 A1 | 1/2018 | Olson |
| 2018/0012080 A1 | 1/2018 | Glaser et al. |
| 2018/0107968 A1 | 4/2018 | Wu et al. |
| 2018/0189763 A1 | 7/2018 | Olmstead et al. |
| 2018/0232796 A1 | 8/2018 | Glaser et al. |
| 2018/0240180 A1 | 8/2018 | Glaser et al. |
| 2018/0245736 A1 | 8/2018 | Patel |
| 2018/0300553 A1 | 10/2018 | Khosla et al. |
| 2018/0322209 A1 | 11/2018 | Jin et al. |
| 2018/0332235 A1 | 11/2018 | Glaser |
| 2018/0332236 A1 | 11/2018 | Glaser et al. |
| 2018/0373928 A1 | 12/2018 | Glaser et al. |
| 2019/0005479 A1 | 1/2019 | Glaser et al. |
| 2019/0028643 A1 | 1/2019 | Oryoji |
| 2019/0043003 A1 | 2/2019 | Fisher et al. |
| 2019/0054347 A1 | 2/2019 | Saigh et al. |
| 2019/0079591 A1 | 3/2019 | Glaser et al. |
| 2019/0114488 A1 | 4/2019 | Glazer et al. |
| 2019/0116322 A1 | 4/2019 | Holzer et al. |
| 2019/0156273 A1 | 5/2019 | Fisher et al. |
| 2019/0156274 A1 | 5/2019 | Fisher et al. |
| 2019/0156275 A1 | 5/2019 | Fisher et al. |
| 2019/0156276 A1 | 5/2019 | Fisher et al. |
| 2019/0156277 A1 | 5/2019 | Fisher et al. |
| 2019/0156506 A1 | 5/2019 | Fisher et al. |
| 2019/0205933 A1 | 7/2019 | Glaser et al. |
| 2019/0333039 A1 | 10/2019 | Glaser et al. |
| 2020/0079412 A1 | 3/2020 | Ramanathan et al. |
| 2020/0134590 A1 | 4/2020 | Glaser et al. |
| 2020/0160670 A1 | 5/2020 | Zalewski et al. |
| 2020/0265494 A1 | 8/2020 | Glaser et al. |

\* cited by examiner

Visual Data

BVO-5000i Device Model

Configuration

```
label: Heart Monitor
type: Device-model
position: <location>
Device_model: BVO-5000i
Signals: [<signal 1 config>,
          <signal 2 config>,
          ...
          <signal 2 config>]
```

Interface Extraction System

```
Heart Monitor:{
    machine_state: state3,
    signals: [
        signal_1: 32,
        signal_2: 114,
        signal_3: 82,
        ...]}
```

Extracted Interface Rep

Visual Data

Configuration

```
label: Front Door
Locking
type: User-interaction
position: <location>
objects: [key, lock,
person]
```

Interface Extraction System

Front Door Locking,
June 21, 2017,
<location>

Extracted Interface Rep

Providing a visual marker associated with at lest one extraction mode

Detecting the visual marker in the image data

Setting at least part of the extraction configuration based on properties of the visual marker Car Position = 5ft

MOBILE USER INTERFACE EXTRACTION

CROSS-REFERENCE TO RELATED APPLICATIONS

This application is a continuation application of U.S. patent application Ser. No. 15/644,801 filed on 9 Jul. 2017, which claims the benefit of U.S. Provisional Application No. 62/360,366, filed on 9 Jul. 2016, and U.S. Provisional Application No. 62/360,369, filed on 9 Jul. 2016, all of which are incorporated in their entireties by this reference.

TECHNICAL FIELD

This invention relates generally to the field of device monitoring, and more specifically to a new and useful system and method for establishing remote integration with a device through a user interface output.

BACKGROUND

There has been a recent trend of creating connected devices or internet of things (IoT) devices. Such devices can provide remote access to information. While a connected device can have benefits over traditional, legacy devices, they are also accompanied by other complications and problems. In many cases, gaining the connected device capabilities requires upgrading to a new product. Upgrading equipment can be costly and risky especially in enterprise situations that depend on the reliability of a device. Even if someone has a connected device, accessing and integrating that device with one or more other systems can be complicated. There are also many cases where it may be beneficial to easily monitor some device but installing a conventional sensing solution is too costly or complicated. Thus, there is a need in the device monitoring field to create a new and useful system and method for establishing remote integration with a device through a user interface output. This invention provides such a new and useful system and method.

DESCRIPTION OF THE EMBODIMENTS

Figure 1:
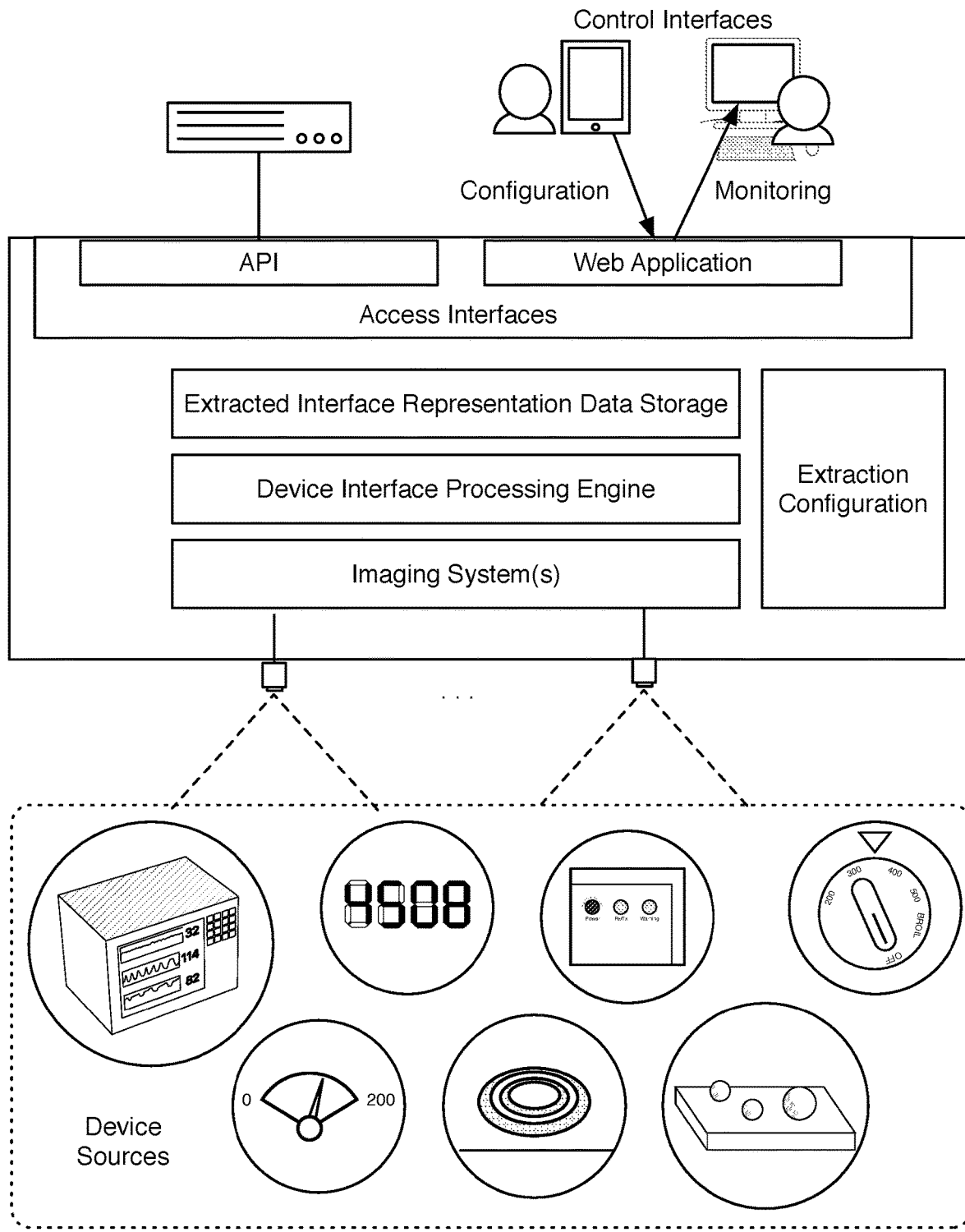
FIG. 1 is a schematic representation of the system and method applied to various types of extraction.

The following description of the embodiments of the invention is not intended to limit the invention to these embodiments but rather to enable a person skilled in the art to make and use this invention.

1. Overview

A system and method for remote integration with a device through a user interface output of a preferred embodiment functions to enable a process for extracting information and data from a device that leverages human accessible and interpretable outputs of the device. The system and method are preferably applicable for applying computer vision and optionally other forms of perceptual sensing to data acquisition of ambient information in an environment. A limited number of modern devices, products, and systems provide data interfaces, but there are a vast number of devices, products, and systems that expose information as usability affordances to human users—most devices designed for use by a human are generally accompanied by interpretable representations of information. However, even in connected devices, much of this information is not exposed for data integration by the actual devices or system. The system and method functions to translate such visually exposed informational manifestations into device data usable in various applications. Accordingly, the system and method can be applied to modern systems as well as legacy systems.

The system and method may be further extended to enable extraction of information from an uncoupled device through any visual and/or audio interface interpretable including machines for visible machine interfaces. In one preferred embodiment, the system and method utilizes a camera to observe a user interface of a device and convert the user interface output into an extracted interface representation. This extracted interface representation can be a formatted data representation of data from the device. Other embodiments can additionally or alternatively utilize a microphone to observe audio-based user interface outputs of a device and convert the user interface output into an accessible interface representation.

As one potential benefit, the system and method can be used for remotely extracting and exposing the interface output of one or more devices. Remote extraction and visual interface translation enables outside devices to be integrated with the system without altering the outside device or its interface. The device can be unconnected to the system and could be substantially "uncooperative" in the sense that integration with the system is passive from the perspective of the outside device. Additionally, the system and method could be applied to multiple devices and multiple device types. For example, legacy equipment, devices with complicated data interfaces, connected devices with limited data access, and other devices could be integrated with the system. With remote extraction, the device could remain operational during system integration, which could be valuable in industrial situations where equipment downtime is undesired. Furthermore, when applied in industrial settings, well-tested and robust systems can maintain their current designs while still being enhanced for data integration, which may have economical as well as reliability benefits.

As another potential benefit, the system and method can be used for devices with digital user interfaces and/or analog user interfaces. The system and method could interpret and convert user interface elements such as a segmented display, a graphical display, an indicator light, or an analog dial into a digital signal. In some cases, a device interface source may not even be traditionally considered a user interface output but may still convey user interpreted information. For example, the angle of a lock switch can convey the binary state of the lock or the height of a liquid or material in a jar can be a visual representation of content quantity. Accordingly, the system and method could be used with a wide variety of device interface sources including but not limited to: a mercury thermometer, a bi-metal thermometer, an LCD thermometer, an amp meter, a watt meter, a tilt sensor, a shock sensor, a pressure sensor, a flow-rate sensor, a scrolling LED display, a light switch, a circuit breaker switch, a door lock latch, an oven dial, the stick shift of a car, a traffic light, an indicator light, rotary dial, a container of fluid, a container of particulate solids, a handwritten message board, a staging area for objects (e.g., outgoing orders at a restaurant), and/or other sources human interpretable outputs information. Additionally, device designs can be customized for visual interpretation by machines in addition to or in place of humans.

As a related potential benefit, the system and method could additionally be applied for customized creation of data integration with analog systems. In everyday life, people create systems that have informational significance by how they are perceived by people. As examples, restaurants have systems for conveying what to cook and when orders are ready for customers; offices have systems for filing documents and the stage in the processing of those documents; factories and offices use whiteboards to convey information to employees; and families develop systems for reminding each other of chores to name an exemplary set of situations where analog systems convey information. Aspects of these may all be candidates for being used with some implementations of the system and method. Similarly, the introduction of the system and method introduces a paradigm shift in how systems can be designed and the ease with which a digital representation of the analog world can be created. This opens up creative use of the system and method without requiring on customized engineering, algorithm creation, or designs of complex costly systems.

As a related potential benefit, the system and method may accommodate a wide variety of types of generic input sources so that the system and method can be adapted to a variety of data collection applications. There are numerous scenarios where it could be beneficial to have the ability to quickly interface with an existing device—the system and method could offer a set of configuration options such that the system and method could be readily adapted for different applications. Scientists, researchers, engineers, and/or hobbyists could utilize the system and method for custom solutions. For example, an individual may quickly setup a solution for monitoring and tracking oven usage by extracting the oven dial position.

As another potential benefit, the system and method could be used for collecting historical analytics of a device. Data collected through the system and method can synchronize data to a data warehousing system where the data could be accessed, processed, or used in any suitable way. Because of the adaptability to be used with a variety of devices, the system and method can be a tool for enabling the data logging capabilities of an IoT device to a wide variety of devices regardless of the devices own networking capabilities.

As another potential benefit, the system and method can be used for detection of a current computing context for use of one or more devices in an unplanned situation. In other words, the use and state of one or more outside devices may be detected and used through the system and method. This can be used for providing more in-depth awareness of current situations for user-facing products, machine devices, and/or robots.

Detection of a current computing context could also be particularly applicable when applied with a wearable where the wearable may be used alongside a number of other devices. A mobile variation of the system or method may additionally use automatic enrollment and configuration of device interface sources. As an example, a digital assistant running through the wearable device can be exposed to visually presented information and use that for various tasks. Use of the system and method can alleviate dependence on all outside devices having a digital form of integration with the wearable device. For example, walking up to a regular ATM device could result in automatic logging of an ATM transaction performed by that user. In another example, viewing a parking meter can automatically start extract the time from the parking meter and the personal assistant could use that extracted data in starting a time. In both cases, the system and method could be applied without the ATM device or parking meter being "smart" or connected in any way.

As a related potential benefit, the system and method can enable the automatic detection, configuration, and extraction of a device interface source.

The system and method could potentially be beneficial to a variety of different use cases. In many respects, the system and method provides a unique technical paradigm shift in treatment of imaging and interfaces. Visual interface translation resulting from the system and method can be used as a tool in a wide variety of applications ranging from robust systematized integrations to quick custom integrations.

In some sense, the system and method could be used as a passive sensing solution (i.e., one that can avoid altering operation of the device) that can be setup and configured ad-hoc without directly interacting with a device interface source. In other words, the system and method may not depend on cooperation by the device interface source. To this end, the system and method can be usable across a wide variety of devices, and the system and method may be used in normalizing information into a common format and data interface. Even if a device is a connected device, it may still be easier and faster to integrate with the connected device using the system and method. The system and method could additionally be used in adapting legacy equipment to act substantially like a connected device.

The system and method may be used within various types of products, used in implementing large scale system integrations, used in logging device state, used as a tool in building customized CV driven solutions, and/or used with other suitable types of applications.

As one application, the system and method can be implemented as components of a product such that the product can be specifically designed to leverage visual interface translation. For example, a lamp or lighting fixture can include an implementation of the system and method to enable control of the illumination state by an unconnected light switch observed by a camera of the lighting fixture. Other household appliances, computing devices, electronic devices, and the like could similarly use functionality of the system and method.

As a related application, the system and method may be implemented as capabilities of an imaging device or application. A digital camera, personal computing device with a camera, a wearable computer (e.g., smart glasses), a camera application, a surveillance camera, a robot, an automobile, and/or other suitable devices may leverage the system and method to enable device interface extraction for various applications.

As another application, the system and method can be implemented as part of a system integration for various industrial applications. A hospital, manufacturing plant, energy plant, chemical lab, store and/or other suitable environments could have a system installation applying the system and method in monitoring operations, events, and data patterns. For example, interface extraction can be used in extracting data from various devices, meters, and control panels. The system and method can be particularly useful in that they can be used with no modification to existing infrastructure. A store could use the system and method for enabling basic sensing devices throughout the store and collecting data remotely through a surveillance system. For example, scales used in a produce department may display weight through a dial and/or digital display. The system and method may be applied in the store to extract the measured weight of fruit using the existing scale interface. A hospital could apply the system and method in monitoring medical monitoring device status. A factory or industrial plant could use the system and method for retrofitting existing infrastructure for data integration and monitoring.

As another application, the system and method may also be implemented as an alternative approach to connected smart sensors. In existing approaches, a device used for logging data is generally produced with a communication module so that it can wirelessly communicate over a network. Not only does this add significant cost to each sensing module, but it also means higher power consumption by the device. It also requires updating existing sensors or devices with the connected smart sensor version. Instantiations of the system and method can be quickly implemented to start extracting data with little adjustment to existing infrastructure. For example, an energy meter could be adapted to a smart meter with logged data by simply having the system and method integrate with the energy meter as a device interface source.

2. Overview of Types of Extraction

The system and method may be used for a variety of different types of extractions including physical state extraction, indicator detection, dial extraction, character extraction, presence extraction, and/or device model extraction as shown in FIG. 1. These extractions may be used in any suitable combination and could include other types of extraction.

Physical state extraction can comprise a variety of detection approaches. Physical state extraction could be based on color, shape, dimensions, area, volume, appearance, presence, position/location, relative position/location, orientation, or other properties. For example, physical state extraction may be adapted to detect the color of a heating element, and thereby infer its temperature using a black-body radiation curve. Indicator detection and dial extraction are varieties of physical state extraction. Physical state could additionally be applied to graphic interpretation. For example, a line graph generated by some device could be interpreted by converting the graph into a data set.

Indicator detection can be used to detect the binary state or n-state classification of an interface element such as an indicator light, a switch, a circuit breaker, or a lever. Indicator detection can be used for device interfaces with explicit states like a switch, but could also be for natural interfaces like detecting state of a coat on a coat rack or classified states such as a TV on-off state.

Dial extraction can be used to characterize the position of a dial. The dial may be used in signaling information such as a meter. For example, gas meters and/or temperature dials may show measurements through a dial. The dial may alternatively be used as a user input control such as a dial used to set the temperature on an oven. Dial extraction can be used for dials aligned along a radial path or a linear path.

Character extraction can be used to read or detect alpha/numeric characters. Character extraction can be used with digital digit displays (e.g., a segmented display), graphical display of text, printed text, or written text. Character extraction can be customized for a resulting data format.

Presence extraction can be used to detect object presence changes. Presence extraction can additionally be position aware so that an object may be only detected when in a particular region. Alternatively, presence extraction could detect the position and/or orientation of an object or person. Presence extraction could additionally include classification of an object.

Device model extraction can be used to interpret the user interface output of a stateful system such as a computing device with multiple modes of operation. The system and method can handle adjusting visual interface translation in coordination with a currently detected state of a device. This can be used to extract image data from used applications on a computing device. This can also be used for extracting image data from custom device interfaces like medical devices, self-service kiosks (e.g., check-in kiosks, ATM kiosks, etc.), control panels, and the like.

Such forms of extraction can preferably be configured for a particular device interface source. Device interface sources can be configured as being statically located in some location or position. Device interface sources could alternatively be configured for detection within certain regions. In other variations, device interface sources can be configured/processed on-demand through CV-based object classification and/or identification. Device interface sources could additionally be configured for automatic enrollment/configuration and/or manual configuration, as well as using permissions for restricting capabilities for configuring, processing image data for extraction, and/or accessing data resulting from extraction.

3. Method

Figure 2:
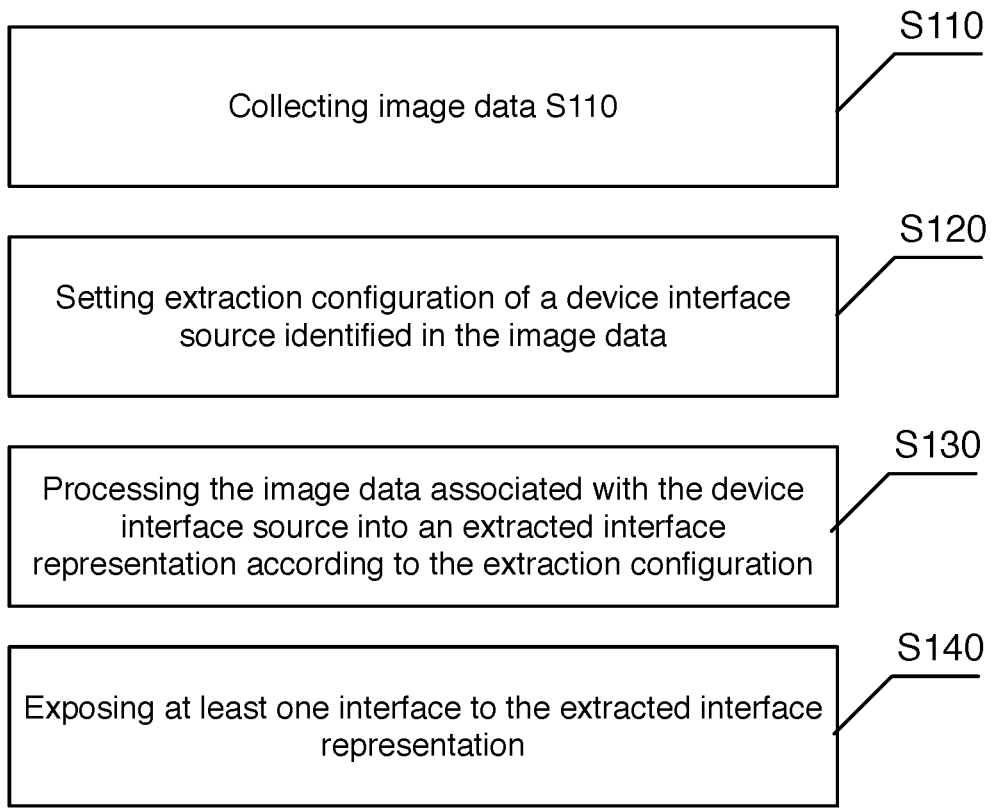
FIG. 2 is a flowchart representation of a first method.

As shown in FIG. 2, a method for establishing, uncoupled, remote integration with a device through a user interface output of a preferred embodiment can include collecting image data S110, setting extraction configuration of a device interface source identified in the image data S120, processing the image data associated with the device interface source into an extracted interface representation according to the extraction configuration S130, and exposing at least one access interface to the extracted interface representation S140.

The method functions to enable a user to setup an interface extraction system and adapt the interface extraction system for a particular use case where one or more device interface sources undergo user interface translation. Preferably, the method performs visual interface translation where graphically apparent information concerning the subject (i.e., the device interface source) The method is preferably implemented in connection with an interface extraction system, which may include a camera to monitor a device and a user application to configure and/or interface with the output of the method. The method is preferably operable on a wide variety of types of extractions including digital and analog interfaces.

The method here is described primarily from the perspective of visual interface translation of a single device interface source. However, the method can additionally be used for extraction of multiple device interface sources from image data from a single camera, coordinating extraction across multiple imaging devices, performing multiple modes of extraction for single device interface sources, and/or other variations.

As used herein, a device interface source is an object observable through image data that has some properties or output representing some information. A device interface source can be an analog device such as an analog thermometer, a digital device such as a digital thermometer, a stateful computing device, or other suitable objects that convey some information through their state. A device interface source can additionally include an object or objects that traditionally are not thought of as a user interface but represent information. For example, the presence of a coat on a coat rack may be indicative of presence of a user and weather conditions and could feasibly be converted as a data feed through the system and method.

Block S110, which includes collecting image data, functions to collect video, pictures, or other imagery of a region potentially containing one or more devices. In one variation, the image data may be directly collected from an imaging device (e.g., a camera) controlled by the interface extraction system. In another variation, the imaging data is collected as a data stream or data file. For example, video may be collected from an existing security system and communicated to the interface extraction system.

Collecting image data preferably includes collecting video data. Collecting image data could alternatively include collecting periodic images or collecting any suitable type of image data. The image data can include high resolution video, low resolution video, photographs from distinct points in time, image data from a fixed point of view, image data from an actuating camera, visual spectrum image data, infrared image data, 3D depth sensing image data, parallax, lidar, radar, sonar, passive illumination, active illumination, and/or any suitable type of image data.

Figure 3:
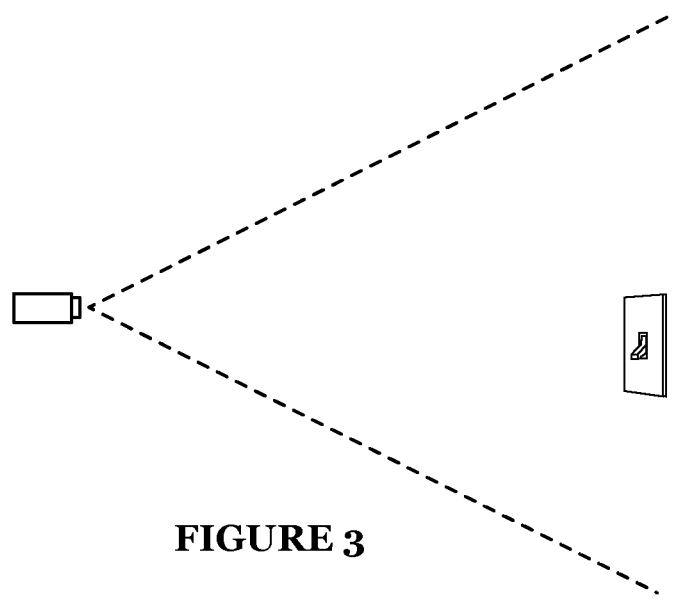
FIGS. 3 and 4 are schematic representations of different types of imaging device configurations.
Figure 4:
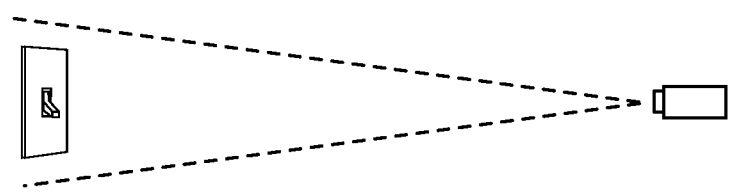

There is preferably at least one imaging device collecting image data. The imaging device is preferably a camera either a video or still camera. The imaging device may collect visual data only, but may additionally collect audio, spatial image data, infrared image data, and/or other forms of imaging data. The imaging device in one variation includes an optical system with a wide-angle field of view, wherein generally a given device interface source will be in a sub-region that does not fill over fifty percent of the field of view as shown in FIG. 3. In a wide-angle imaging device variation, locating of the device interface source may be a process performed when setting extraction configuration in block S120. The imaging device in a second variation includes an optical system with a targeted field of view, wherein generally a given device interface source will fill a significant portion of the field of view (e.g., greater than twenty-five percent of the field of view) as shown in FIG. 4. In a targeted imaging device variation, a device interface source may be specified by simply being present or centered in the field of view.

The imaging device may be a stationary imaging device, where the imaging device preferably has a substantially stationary field of view. The imaging device in a stationary variation is preferably positioned to observe an area containing or potentially containing a device of interest. For example, a user mounts or positions a camera at a region to be monitored. In some cases, the device interface source and the scene are substantially stationary. In another variation, the scene is stationary. In another variation, the relative position of the imaging device and the device interface source are substantially stationary. For example, the camera and device interface source may be mounted on a moving vehicle, but the relative position remains substantially stationary. In some variations, the imaging device may additionally be actuated so as to move or be reoriented in different directions. For example, a mounted camera that rotates back and forth. In this variation, actuation position and changes in orientation/position can be accounted for in understanding the position of the device interface source.

Figure 5:
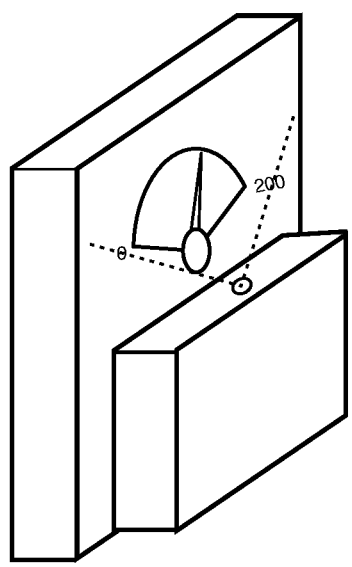
FIG. 5 is a schematic representation of a variation where the imaging device is directly coupled to the device interface source.

A stationary imaging device can be a mounted at a removed/displaced observation point. This can include mounting the imaging device to a spatially removed location from one or more device interface sources as shown in FIGS. 3 and 4. For example, a camera mounted on a wall opposite an oven could track the dials of the oven. In another variation, the imaging device may be an imaging device directly coupled to or positioned substantially near a device as shown in FIG. 5. For example, the imaging device may include a fixturing system to mount the imaging device alongside the visual interface to be extracted. A custom optical system may be used optically account for a non-direct viewing angle. An optical system can facilitate correcting for orientation misalignment of the camera imaging plane and a subject plane, which can mitigate distortion and/or improve focus for regions of interest along a plane of a user interface. A Scheimpflug (e.g., tilt shift) optical system can create a wedge-shaped depth of field that can be aligned with the subject plane (e.g., the plane of a user interface display). A directly mounted imaging device may be particularly applicable for high reliability applications.

For example, a directly mounted imaging device may cover the face of a gas meter or pressure valve. In such an implementation, the system may include an output display such that collected data can be mirrored on a display (as a data representation and/or an image representation), which can be helpful if the imaging device obstructs the view of the actual output In another example, the screen of a medical monitoring device may have an imaging device mounted along one border with a corrective optical system as described above.

The imaging device may alternatively be a movable imaging device. For example, images and video collected from a mobile computing device like a smart phone can be used as image data. Alternatively, an imaging device integrated into a wearable computing device like smart glasses or a body camera can provide the image data. In a movable imaging device, the extraction configuration can be mapped to an image collection position.

In particular for the movable imaging devices but similarly applicable for other types of imaging devices, user accounts may be associated with an imaging device. When the method is implemented as a platform for distributed visual interface extraction, permissions may be used for sharing and cooperative collection of image data. In some cases, image data collected by one user may be used for visual interface extraction of data viewable by a second user and not necessarily the user account that provided the image data.

The above imaging device may additionally be used in an imaging device network that collects image data from multiple imaging devices. Preferably, collecting image data occurs from a variety of capture points wherein collecting image data includes collecting image data from multiple image capture devices (e.g., cameras) distributed at distinct points in an environment. The set of capture points can include overlapping and/or non-overlapping views of monitored regions in an environment. The set of capture points can additionally establish a high-density imaging system within the environment. The image data preferably substantially covers a continuous region. However, the collected image data may alternatively constitute non-continuous regions with holes, gaps, uninspected regions, and/or non-contiguous regions. The imaging device network may be used for monitoring distinct regions and distinct devices. The imaging devices may alternatively have overlapping fields of view and, in some cases, monitor the same device. Redundant observation of a device interface can be used to provide enhanced reliability in visual interface extraction, where one imaging device can provide visual observation of a device interface source when another imaging device is blocked. An imaging device network may additionally be used in tracking a device interface source through an environment while periodically or continuously performing visual interface extraction.

The method may additionally be modified to work with auditory interface elements wherein collecting image data may include collecting audio-visual data. Alternatively, collection of audio may be performed separately from the imaging devices. A device may generate distinct sounds to signal different information. These sounds may be characterized by different tone patterns. Auditory data could be collected through a microphone. The auditory sounds can be processed to convert the auditory sounds into an extracted interface representation. For example, a device may emit a particular alarm sound when a sensed metric satisfies some condition, that particular alarm sound could be detected, and a data object could be updated with a property indicating the detected condition.

Block S120, which includes setting extraction configuration of a device interface source identified in the image data, functions to setup a device, interface output, or other contextually-loaded region or object for monitoring. The extraction configuration preferably specifies regions of interest in the image data and how the image data is to be converted into a parameterized data format representing information conveyed through the device interface source.

The method may enable automatic setting of the extraction configuration of a device interface source. For example, one or more types of device interface sources may be objects that can be automatically detected through computer vision techniques of object detection/classification and then enrolled for extraction. In an instance of automatically setting extraction configuration, the method can include detecting a type of device interface source in the image data through object recognition, and automatically setting the extraction configuration of the detected device interface source according to the type of device interface source.

Figure 6:
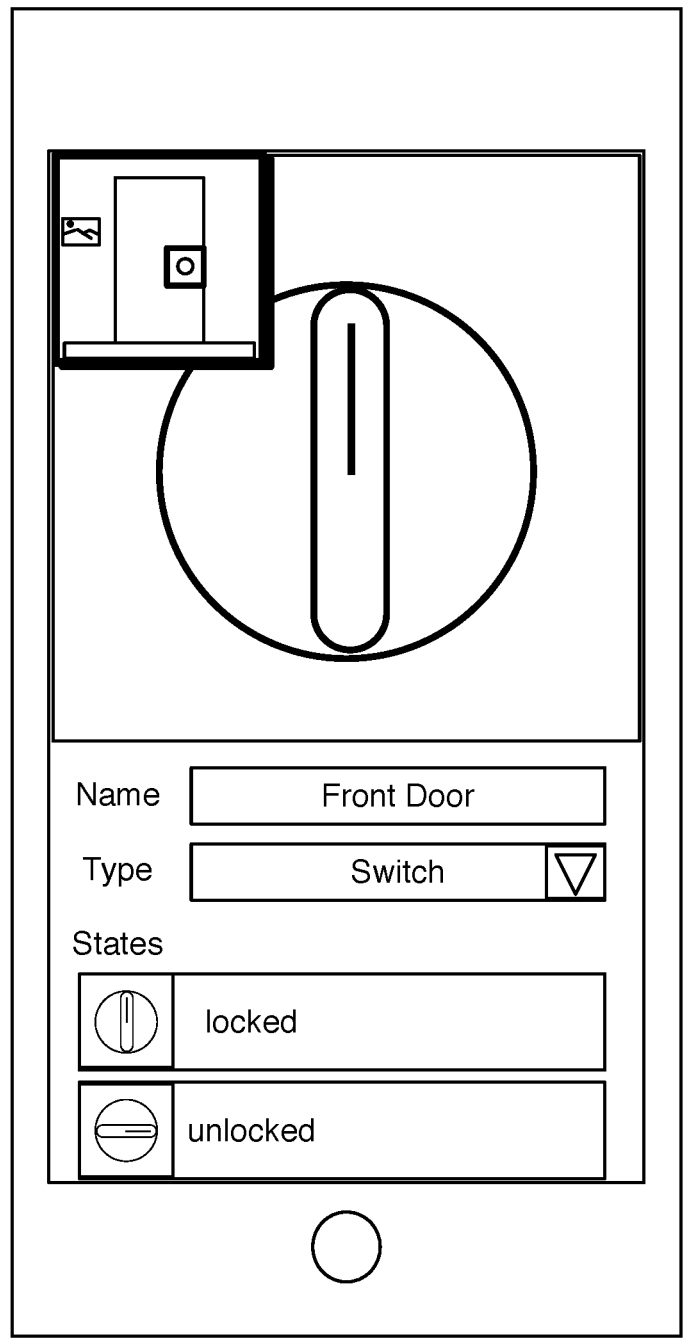
FIG. 6 is an exemplary schematic representation of a customization user interface.

Alternatively, parts of the configuration process may be performed or augmented through user input. In one implementation, a user can use a user interface to configure extraction of the device interface source as shown in FIG. 6. In an instance involving manual setting of extraction configuration, the method can include receiving manual configuration input through a coupled management application. The user interface may display an image from the imaging device and "add" a device for extraction by specifying a position of a device and providing information on how the interface should be interpreted. In yet another variation, augmentation to the device interface source can enhance monitoring of a device interface source.

The setting of extraction configuration may be performed alongside image data collection. For example, actual image data can be used in locating the region of the device interface source. The extraction configuration may alternatively be set independent of image data collection. In one variation, a user interface or configuration file/script may be used in setting the properties of an extraction configuration independent of or without real-time use of image data.

Figure 7:
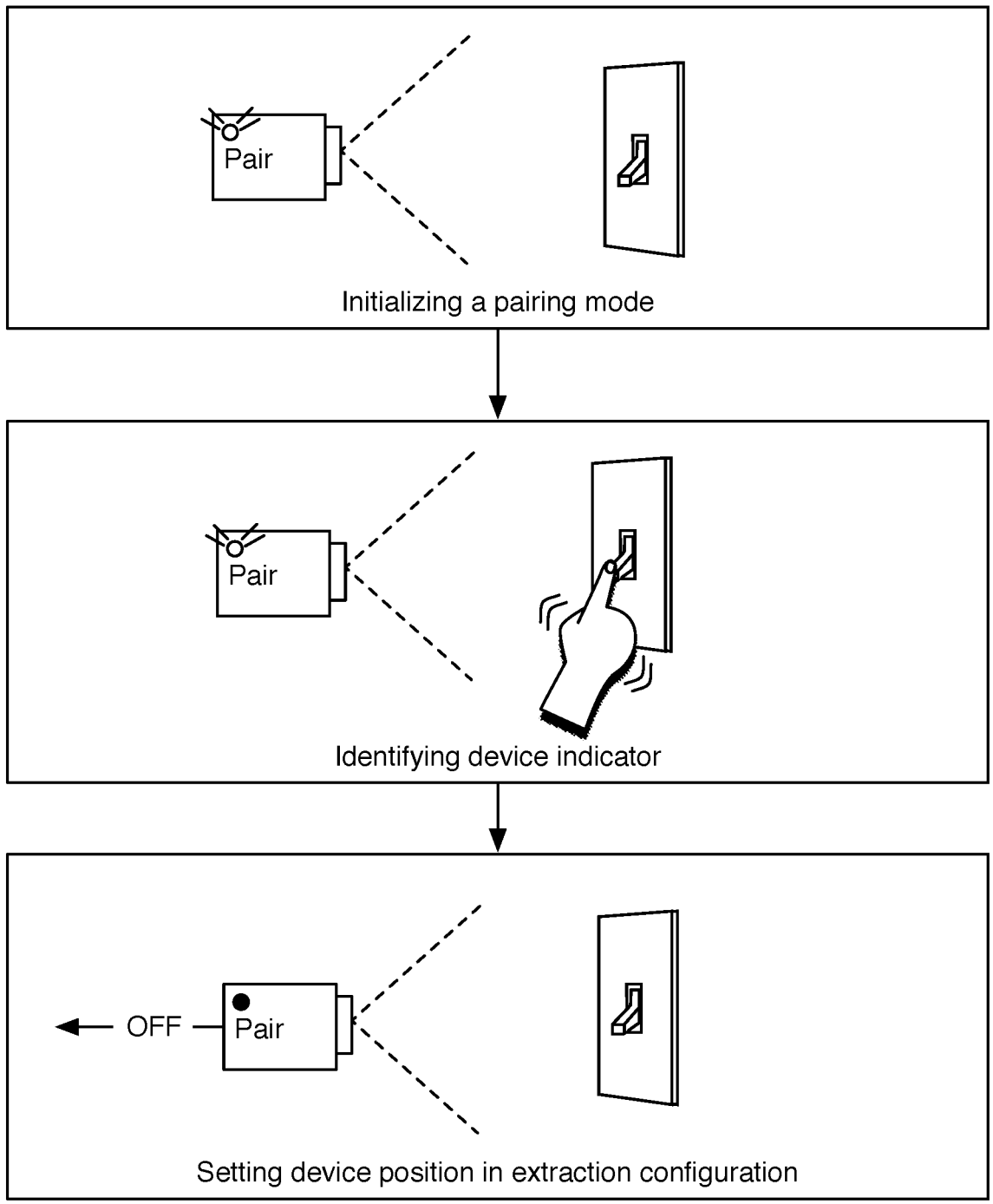
FIG. 7 is a schematic representation of an exemplary pairing process.

In yet another variation, the configuration may be set through a guided process during a pairing mode of the system. In a guided process, method may include initializing a pairing mode, identifying a device indicator in the image data during the pairing mode, and associating a device position property of the extraction configuration to a region indicated by the device indicator as shown in FIG. 7. The interface extraction system can preferably be set or requested to enter the pairing mode by a user, and during the pairing mode the system preferably operates to facilitate the setting of extraction configuration. Two preferred variations of identifying of a device indicator can include detecting a user gesture and detecting a visual marker (e.g., a QR code). Other forms of marking a region could alternatively be used.

In the variation of detecting a user gesture as a device indicator, a user may perform some detectable gesture that is detectable through computer vision. Gestures could be static gestures (e.g., thumbs up) or action gestures (e.g., swiping to the left). The user preferably performs that gesture in proximity or against the device interface source. For example, a user may be direct to place their hand, palm open in front of the device interface source of interest and count down using their fingers. The interface extraction system can produce signaling beeps for each count and then confirmation beep when that region is configured for interface extraction. Any suitable framework for gestures may be used.

In the variation of detecting a visual marker, a visual marker may be used to indicate a candidate device interface source. The visual marker could be statically fixed to the device interface source. Alternatively, the visual marker could be a card or some object that a user temporarily positions next to the device interface source. As described below, visual markers can additionally or alternatively be used in various approaches to configuration.

In one variation the initializing of a pairing mode may additionally include setting the pairing mode for a particular type of extraction, which in some variations may simplify the configuration process to identifying the region/location of the device interface source. For example, a user could turn on a dial pairing mode on an interface extraction system, then perform some action to mark the device interface source of interest, and then that device interface source can be configured for extraction as a dial.

In some instances, the interface extraction system may come pre-configured for extraction of one or more device interface sources, in which case the method may not necessitate explicit setting of extraction configuration. As one exemplary use-case, a product using an interface extraction system may be pre-configured during production to recognize and respond to one or more user interfaces. For example, a lamp may come with an imaging device to alter illumination state in coordination with a paired light switch visible in the field of view.

Figure 8:
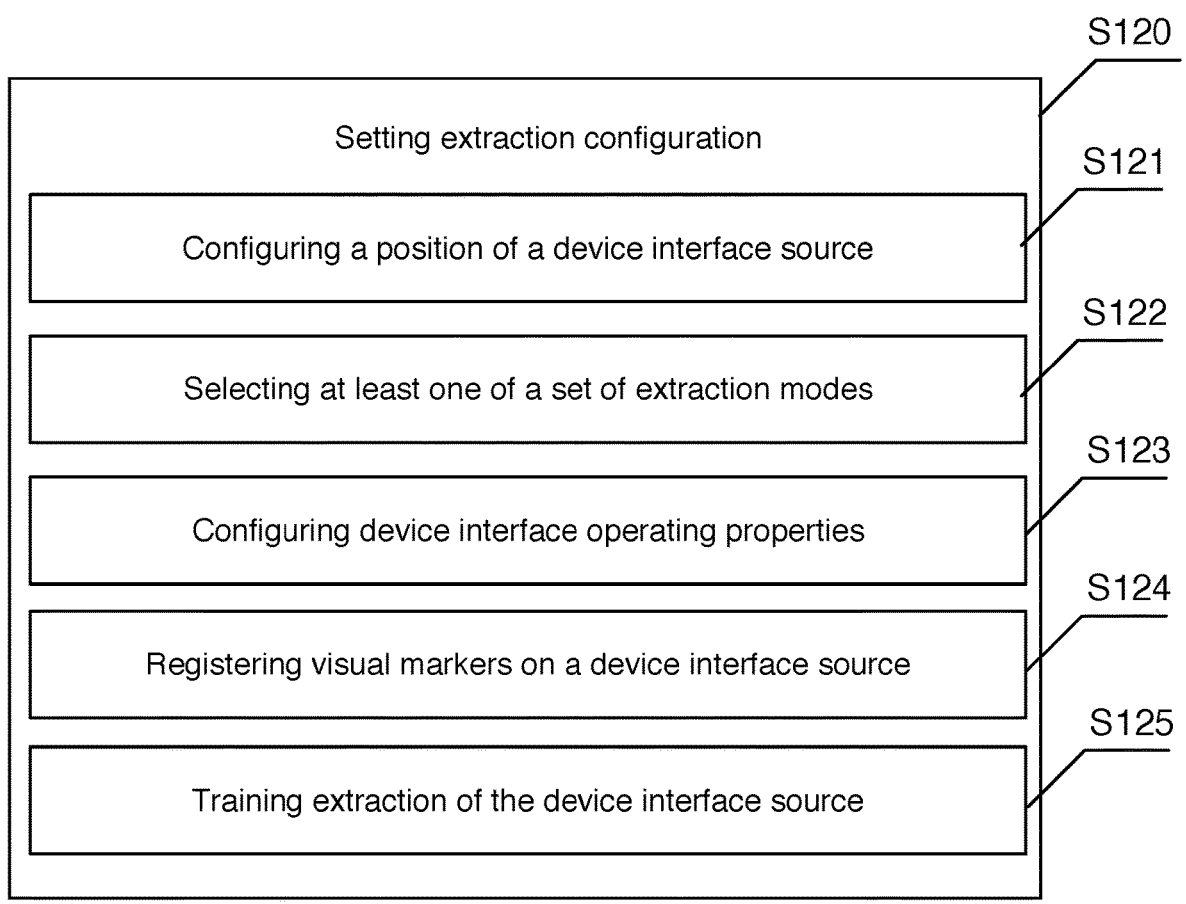
FIG. 8 is a detailed flowchart representation of configuring a device interface source.

As shown in FIG. 8, configuring a device interface source can include configuring a position of a device interface source S121, selecting at least one of a set of extraction modes S122, and/or configuring device interface operating properties S123. Configuring a device interface source may additionally include registering visual markers on a device interface source S124, and, in some variations, configuring a device interface source may additionally include training extraction of the device interface source S125. Depending on the application, any suitable combination of the processes S121, S122, S123, S124, and/or S125 may be used.

Block S121, which includes configuring a position of a device interface source, functions to indicate one or more locations in the image data associated with the device interface source. Configuring position can set a location and region of image data. Additionally, configuring position can include setting orientation of the device interface source.

Two potential approaches to configuring a position of a device interface source S121 can include detecting a device interface source in the image data and/or receiving selection of a position.

Detecting a device interface source in the image data functions to use computer vision to recognize a type of device interface source. Detection of a device interface source will preferably additionally identify a position and region in the image data. In some variations, detecting a device interface may additionally be used in accessing preconfigured default extraction configuration for that type of device interface source. For example, detecting a light switch can automatically result in having basic extraction configuration enabled for that light switch. In a related variation, visual marker may be automatically detected using computer vision and used in setting position and possibly other extraction configuration properties.

Various techniques may be employed in object detection and classification of a device interface source such as a "bag of features" approach, convolutional neural networks (CNN), statistical machine learning, or other suitable approaches. Neural networks or CNNS such as Fast regional-CNN (r-CNN), Faster R-CNN, Mask R-CNN, and/or other neural network variations and implementations can be executed as computer vision driven object classification processes. Image feature extraction and classification is an additional or alternative approach, which may use processes like visual words, constellation of feature classification, and bag-of-words classification processes. These and other classification techniques can include use of scale-invariant feature transform (SIFT), speeded up robust features (SURF), various feature extraction techniques, cascade classifiers, Naive-Bayes, support vector machines, and/or other suitable techniques. Object classification and detection models can be trained on particular types of device interface sources.

Receiving selection of a position functions to have the region set through user input or other forms of input. The selection of the position in one variation can involve user input indicating a position and/or region to associate with a device interface source.

In one variation, selection of the position of the device interface source can be received through a graphical user interface. A user application could display the image data and provide a user interface tool for selection of one or more regions of a device interface source. Such position specification may alternatively be specified programmatically through an application programming interface (API) or other suitable type of interface.

In another variation, selection of the position can be achieved through some interaction during a pairing mode. The pairing mode can be a special mode that when engaged, device interface sources can be identified, located, enrolled, and at least partially configured. Various forms of interactions may be supported for pairing such as a user interaction variation and a visual marker variation.

In a user interaction variation, a pairing mode can include initiating the paring mode in the interface extraction system (e.g., the imaging device); detecting a user interaction in a region of the image data; and setting the position of the device interface source relative to the region of the user interaction. For example, during a pairing mode, a user could toggle a light switch multiple times to select the region of the light switch as a device interface source. The interaction could additionally be used in training or specifying other properties. In the light switch example, toggling the light switch can indicate the different states of the light switch.

In a visual marker variation, a pairing mode can include initiating the paring mode in the interface extraction system (e.g., the imaging device); identifying a visual marker and region of the visual marker in the image data; and setting the position of a device interface source relative to the visual marker. The visual marker may explicitly set the bounds of an inspected region for a device interface source. The visual marker may alternatively be used as user selection of one of a set of possible device interface sources. For example, the visual marker may be placed somewhere in the field of view, and then object detection of viable device using computer vision techniques can be used.

In the variation where the imaging device is movable, configuring position of the device can additionally include setting image collection position, which functions to detect the location and/or orientation of the imaging device when viewing the device interface source. The image collection position may additionally use distance estimation and scene analysis to understand the positioning of the device interface source, which can be used in detecting what image data collected from other perspectives could be candidates for observing the device interface source. The image collection position can include a global location, a local position (e.g., relative to a particular environment), structural position (e.g., room or location in a building or facility), and/or other forms location information. Orientation, direction, and/or information pertaining to the field of view of the imaging device may additionally be included in the image collection position information. A movable camera will preferably have a location service (e.g., GPS, Wi-Fi positioning service, etc.) and/or an inertial measurement unit (e.g., three-axis accelerometer, three-axis gyroscope, and magnetometer) where location and orientation data can be stored as the image collection position.

Selecting at least one of a set of extraction modes S122 can be used when the method supports a plurality of types of extractions. The type of extraction can be set to customize the visual interface translation for the particular device interface source. The set of extraction modes can include physical state detection mode, an indicator detection mode, a dial extraction mode, a switch extraction mode, a character extraction mode, a presence extraction mode, a device model extraction mode, and/or other suitable modes of extraction.

The different extraction modes may have more granular types of extractions. For example, the physical state detection mode represents one class of extraction modes that can include the indicator detection mode and the dial extraction mode. In the case of a device model extraction mode, a particular device model is preferably specified since a device model extraction mode is generally customized to a particular type of stateful device. The different extraction modes will preferably define different operating parameters in block S123 and may offer configuration options specific to the particular extraction mode. The different extraction modes will additionally trigger correspondingly different processing routines in block S130.

Each position of a device interface source is preferably mapped to at least one type of extraction. In some variations, a single device interface source may have multiple types of extractions configured. In one variation, selection of an extraction mode is specified by received user input indicating one or more types of extraction. In another variation, the method may use computer vision based object detection, visual marker detection, or other classification approaches to automatically set the extraction mode.

In some cases, multiple types of extraction may be set for an overlapping region of the image data. Some devices may communicate information through a variety of mechanisms, and the method can isolate this information through different types of extractions. For example, a display may display a three-digit number and indicate another property by illuminating the display in one of three different colors—character extraction and color-based physical state extraction can be used simultaneously on that one device.

Block S123, which includes configuring device interface operating properties, functions to set or define parameters that characterize the way a device interface source changes and should be interpreted. The different types of extraction preferably have different sets of operating properties that characterize the components, mechanics, and models for how a particular type of device interface source operates.

Different sets of operating properties may be applicable for physical state extraction, indicator detection, dial extraction, character extraction, presence extraction, device model extraction, and/or any other types or sub-classes of interface extraction. Some varieties may have a small set of operating properties such as setting the value range and metrics of signal dial. Other varieties may have complex operating properties such as device model extraction, which may include multiple state-machines and multiple child device interface source extractions as part of the operating property for one computing device.

Configuring of operating properties can be manually configured, pre-configured to default values, and/or have automatic configuration. Automatic configuration may use computer vision in interpreting and setting one or more operating properties. In the example, of the dial gauge above, the range of values indicated by the dial could be detected through optical character recognition, automatically setting the value range. When being set through at least partial user configuration, the visual rendering of the image data can be augmented with a rendering that visually represents how the device interface source will be monitored. For example, during setting of operating properties, a substantially real-time extracted interface representation can be generated from image data.

Different implementations may expose different levels of operating properties. Advanced properties may expose configuration of low-level interface modeling properties. Higher-level generalized configuration can provide generalized operating properties for common classes of device interface sources. Such generalized operating properties may involve selection of a class of device interface source and then setting of a small set of basic properties. For example, a dial input may be selected for an oven where the temperature range are configurable properties so that based on the angle a set temperature can be extracted. The method may additionally expose a programmatic layer to enable third parties to build out custom logic for a device interface source wherein the operating properties may be defined in a configuration file(s) or application.

As described below, the processing of the image data to generate an extracted interface representation may involve multiple processing stages of formatting, recognition, classification, analysis, and/or integration. Operating properties may be configurable for each of these stages or one of these stages. In some variations, operating properties are not configurable by a user and are pre-configured or automatically set.

As examples of basic operating properties that may apply to many types of extraction, setting operating properties can include aspects such as setting units and setting valid data values, which functions to set the labeling and formatting of the data. Units can be used to label or indicate the meaning of the data. Valid data values can set the space of values expected. This can include setting number value ranges, expected numeral/character output space, value formatting, and/or other properties of valid or likely output from the device interface source. In some cases, the method can support setting of expected operating state to bias the detection to normal operating conditions or conversely make more sensitive to certain conditions. Additionally, the temporal properties of detection and processing such as sampling frequency may be set. Other basic operating properties can include setting different actions or ways of treating. Processing and analysis logic may additionally be configurable such that customized logic can be applied on basic parameterized interface representations. Different types of extractions may use different operating properties for defining the mechanics of a particular device.

Configuring operating properties for a form of physical state extraction can be used to set the sensed properties of one or more objects in a particular region. Physical state extraction can include many various forms of state extraction including detecting general physical state properties, indicator detection, forms of dial extraction, forms of switch or mechanism extraction, presence extraction, and others.

Figure 9:
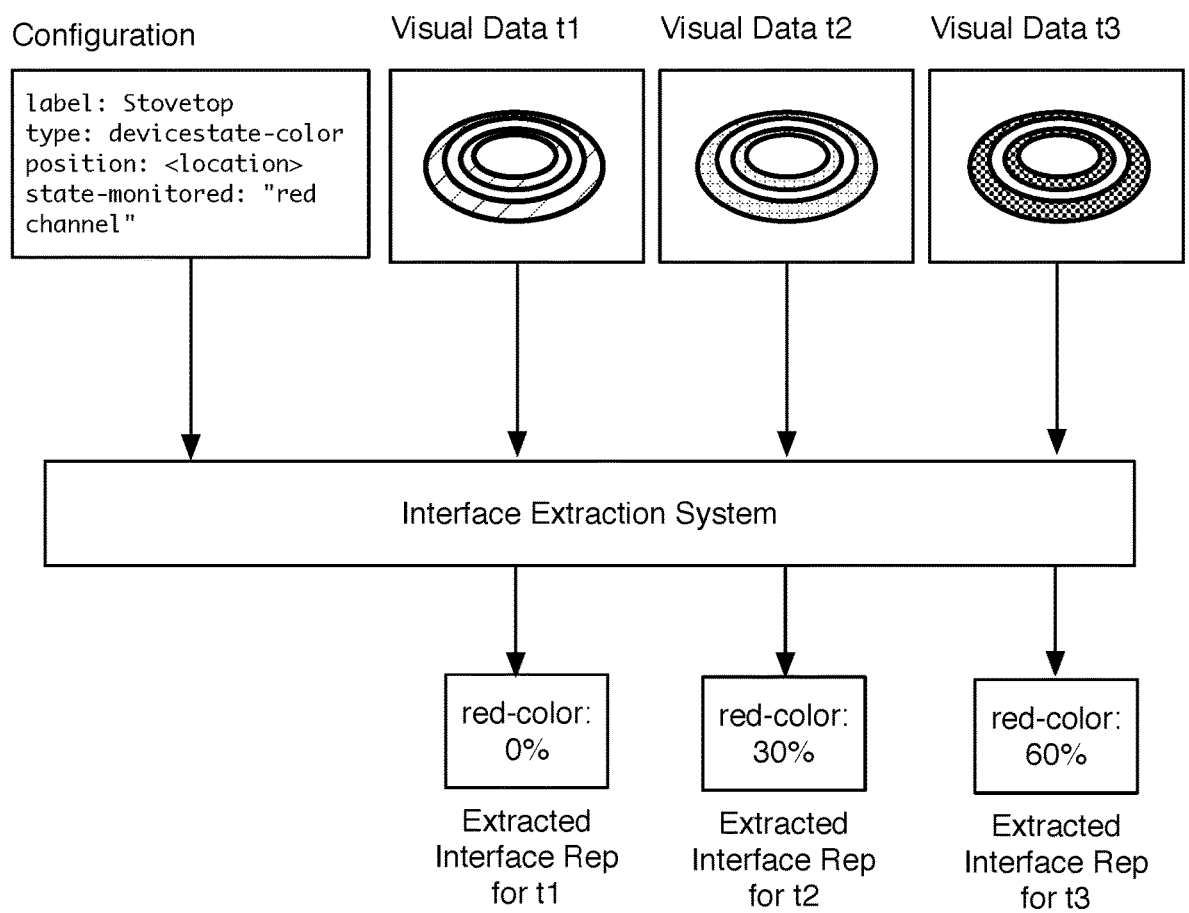
FIG. 9 is a graphical representation of the method applied to physical state extraction.

General physical state properties may include setting operating properties that characterize one or more physical attributes of the visual appearance of an object or objects can be monitored in association with a device interface source such as color, size, shape, dimensions, area, volume, appearance, or other properties. As shown in FIG. 9, a user may configure a stove top to be monitored based on the color of the burners. Note that the color range may extend into the infrared in order to better capture color data that can effectively be converted into temperature. Infrared imaging devices can be used for monitoring object temperature, melting of solid, evaporation of a liquid, leaking of a pressurized gas or liquid, paint drying determination, moisture, and/or other aspects.

Figure 10:
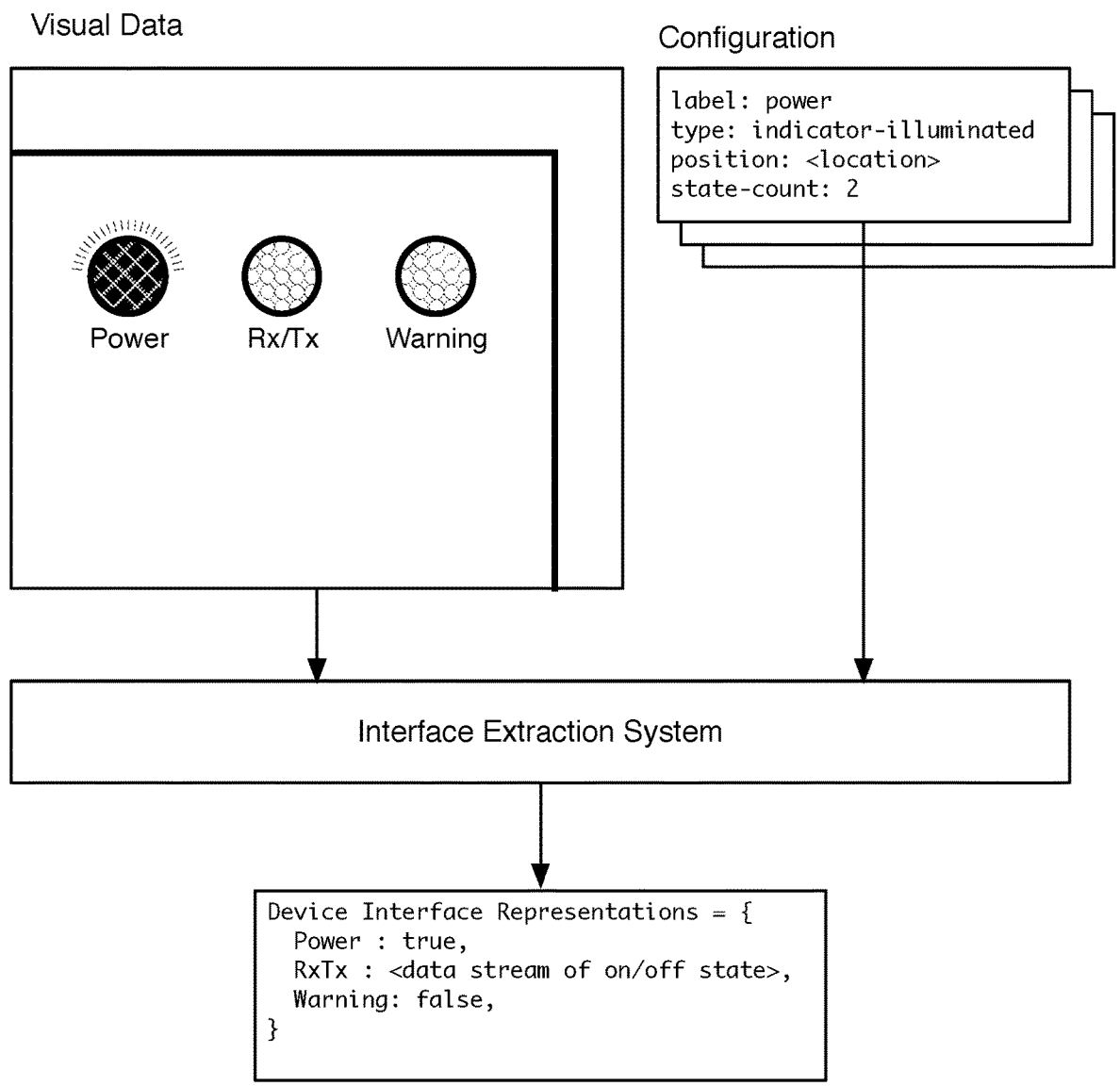
FIGS. 10 and 11 are graphical representations of the method applied to indicator detection.
Figure 11:
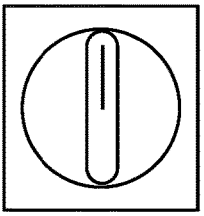

As shown in FIG. 10, configuring operating properties for indicator detection can include specifying the number of indicated states and classifying at least a subset of the indicated states. The type of indicator could be another property such as illuminated indicator, color indicator, position indicator, shape indicator, and the like. For example, a user may note that an LED indicator light has two states and that the current state is "off". Image data can be collected and associated with the "off" state. In one variation, image data may be stored and used for visual comparison. Alternatively, a set of image processing routines may be performed to characterize the state algorithmically. The user may note that the other state is "on". The user may optionally activate the LED indicator light so that image data can be collected on that state. Similarly, an analog indicator such as a light switch or a lock knob could be configured with multiple positional states being configured as shown in FIG. 11. Any number of states can be configured for an indicator.

Figure 12:
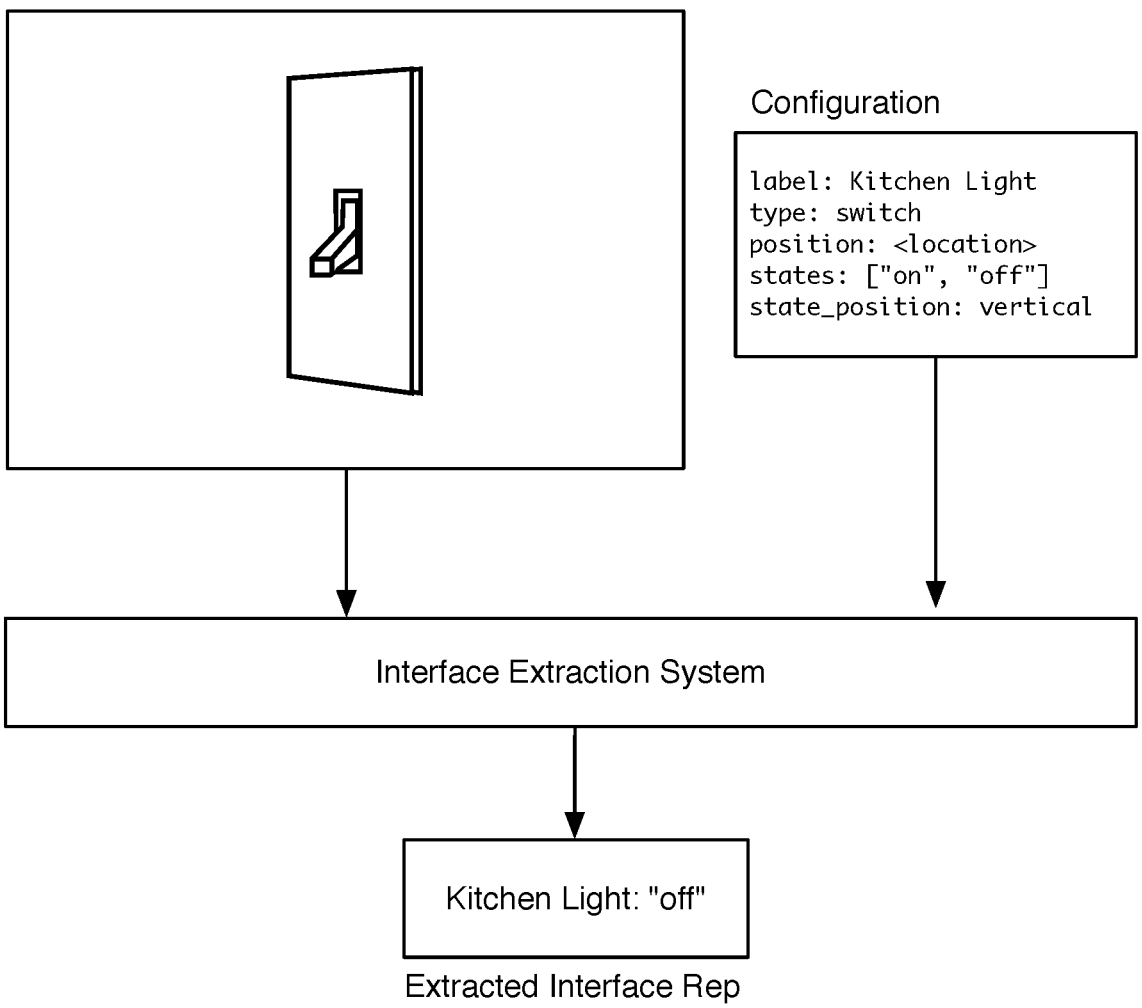
FIG. 12 is a graphical representation of the method applied to switch state extraction.

An indicator can additionally be used as a form of a switch extraction more, which functions to detect the positional state of a mechanism with two or more stable state configurations as shown in FIG. 12. The switch can be a light switch, a lever, or other suitable mechanism. Switch extraction can have similarities to indicator extraction and/or dial extraction. Preferably, the setting the operating properties includes setting the number of possible states and the respective labels or interpretation of each state. In some cases, some simple state machine logic may be configured as an operating property to specify the possible transitions between states.

Figure 13:
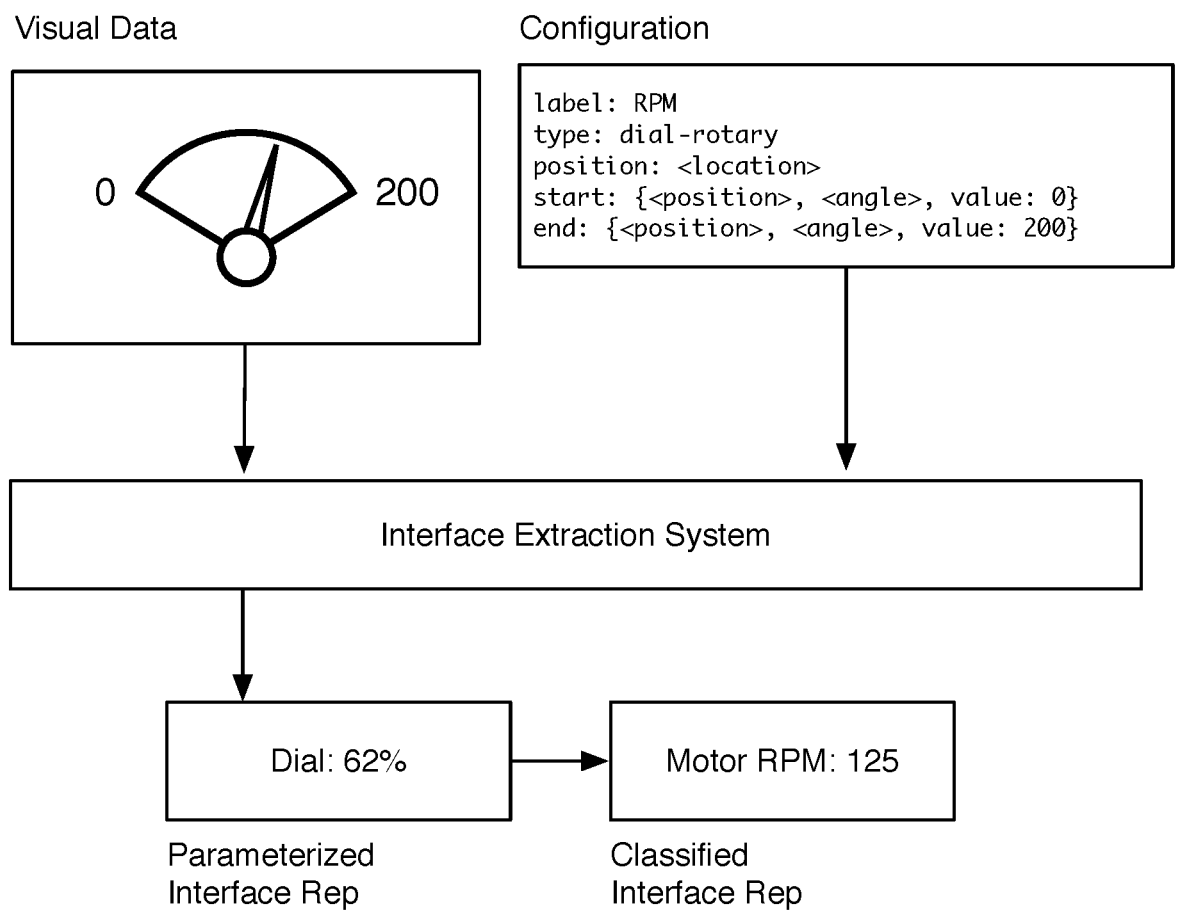
FIGS. 13 and 14 are graphical representations of the method applied to dial extraction.
Figure 14:
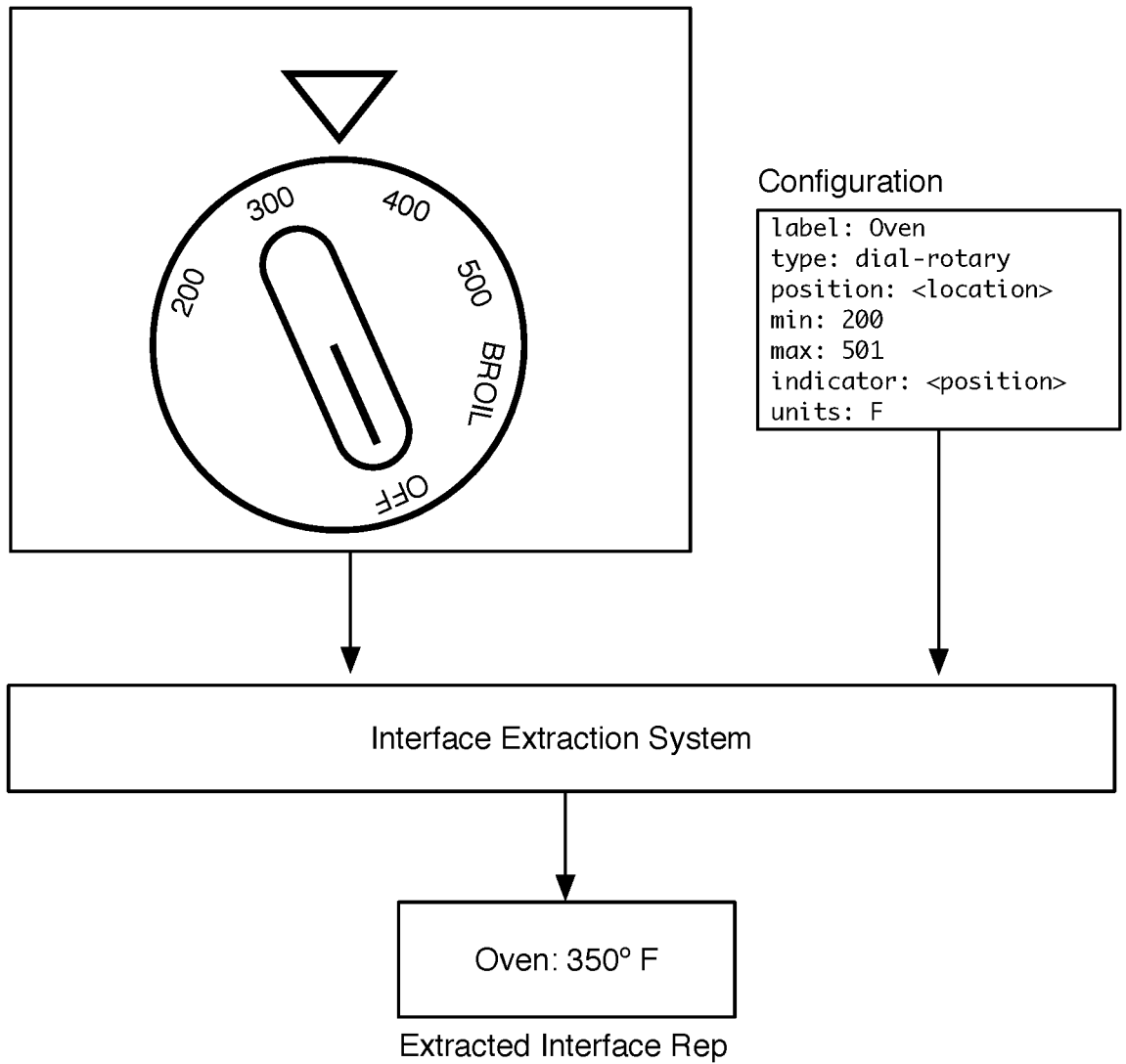

As shown in FIG. 13, configuring operating properties for dial extraction can include specifying the minimum range of the dial, a maximum range of the dial, intermediary values, the type of indicator, the path of the indicator, and/or other aspects. The intermediary values can be used to show how values vary along the path of the indicator. Values can vary linearly, logarithmically, exponentially, or with any suitable transfer function. The path of the indicator can be an arc for a radial dial. The path of the indicator may alternatively be linear for a linear dial such as a thermometer. When the dial device is actively used as a user interface output, the indicator is preferably visually distinct. When the dial device is used primarily as a user input, then the indicator may be indicated through the visual appearance of a knob or dial. For example, an oven dial may have a slight protrusion used to indicate its position (as well as serving as a grip for the user). In another variation, the dial may be reversed where the indicator is fixed, and the value rotates as in the oven example shown in FIG. 14.

In some cases, a dial may be a continuous dial that can rotate continuously such as a clock hand. A sampling rate may be set based on the maximum rate at which the dial can rotate so that the method can monitor the continuous dial's progress. The starting position could be initiated when setting up the continuous dial so that subsequent rotation can be tracked.

Figure 15:
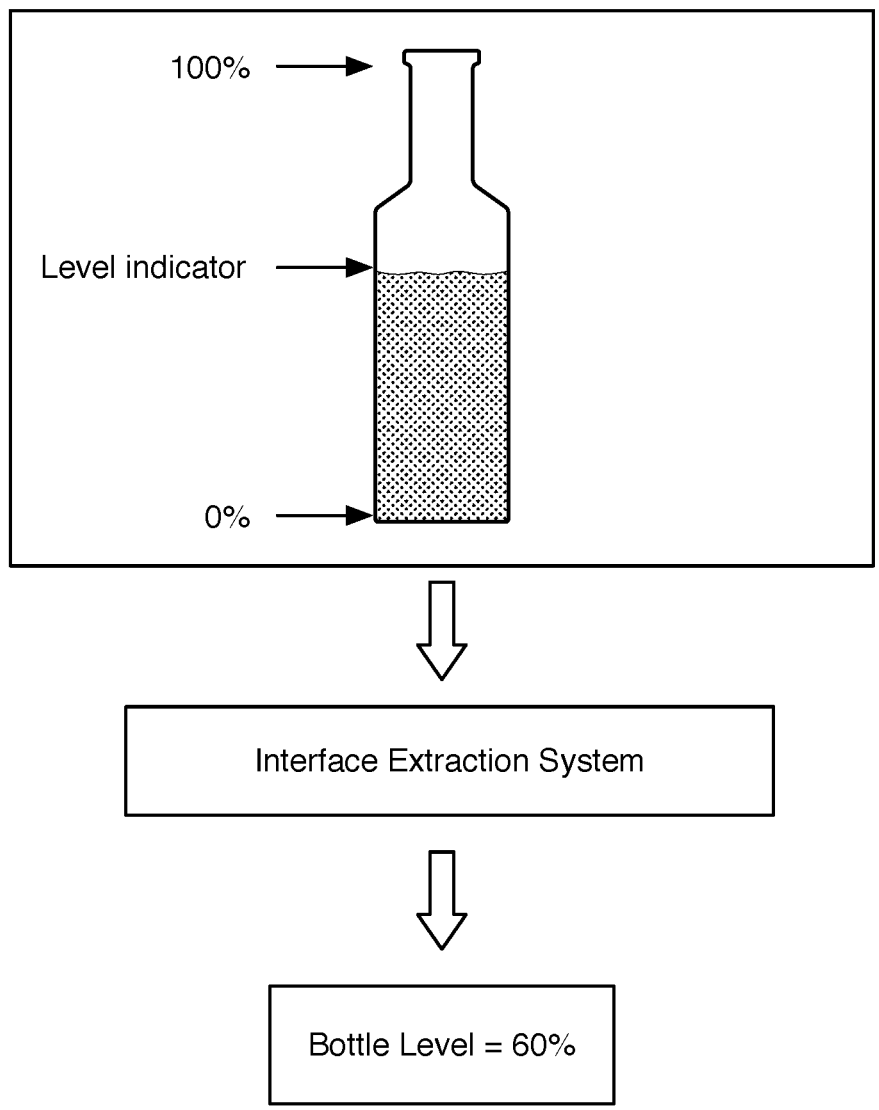
FIG. 15 is a graphical representation of the method used in a dial extraction mode applied to an analog device interface.

In some cases, a dial extraction may be configured to indicate progress of an element between at least two positions. Other forms of extraction may enable extraction of position in multiple dimensions. As shown in FIG. 15, the content level in a container could be treated like a dial with the content level acting as the indicator between the top and bottom positions, and the transfer function being proportional to the area cross section at each gradation. This could be used for bottles and/or other containers, where the contents can be treated as a linear indicator along a vertical scale. Deeper operating property customization, such as defining a mapping between indicator position and bottle volume, can enable extraction of volumes.

Figure 16:
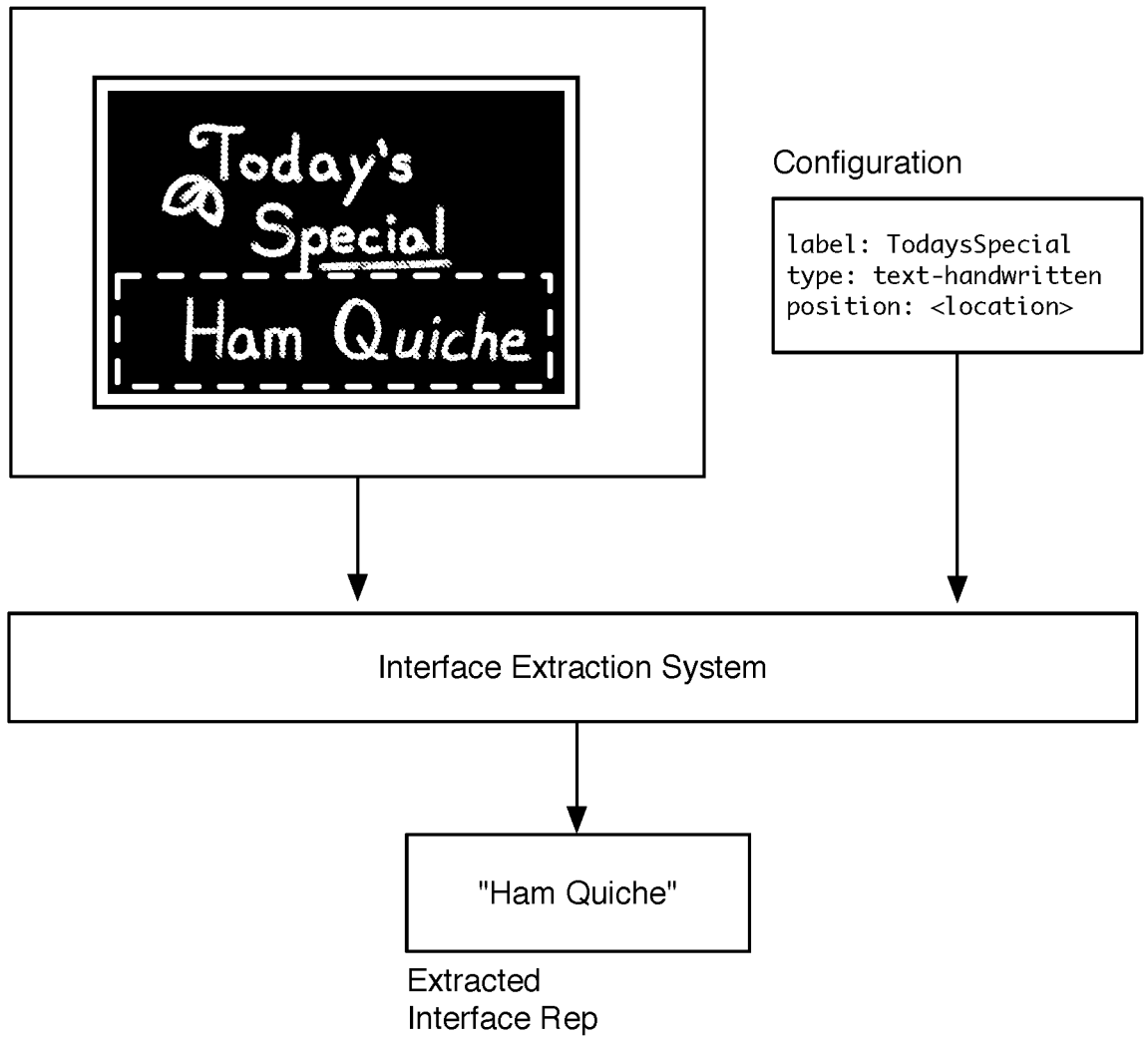
FIGS. 16 and 17 are graphical representations of the method applied to character extraction.
Figure 17:
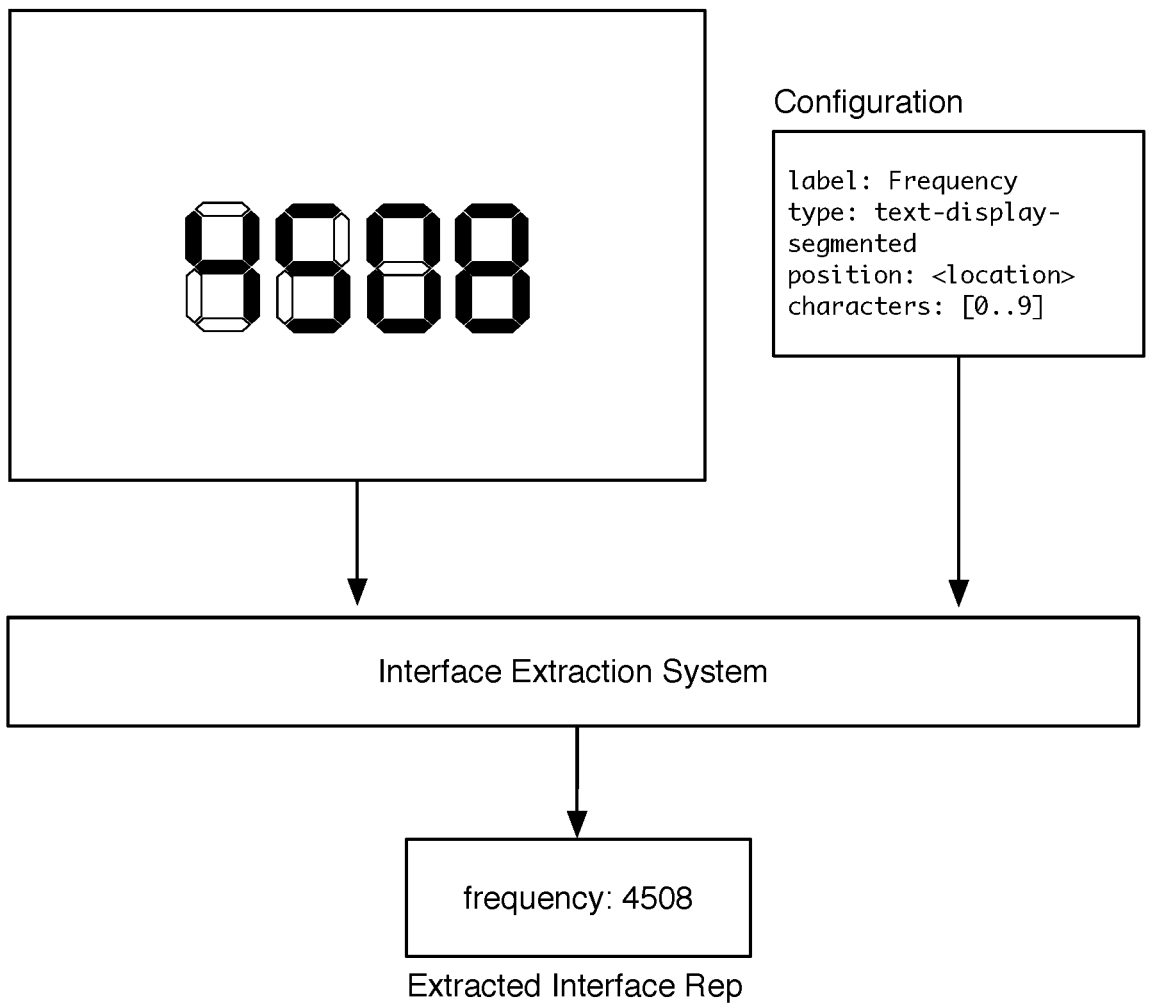

As shown in FIG. 16, character extraction functions to convert displayed, written, or printed alphanumeric characters into computer readable text data. Configuring character extraction can include setting the region where text is extracted and optionally properties of the text. The properties of the text can include valid characters (e.g., only numbers or only letters A-F), the number of characters, the font or format of the characters, the number of lines, the orientation of the characters, and/or other properties. As shown in FIG. 17, a seven-segment numerical display could be configured to convert the display into numbers representing the current frequency setting of the device.

Figure 18:
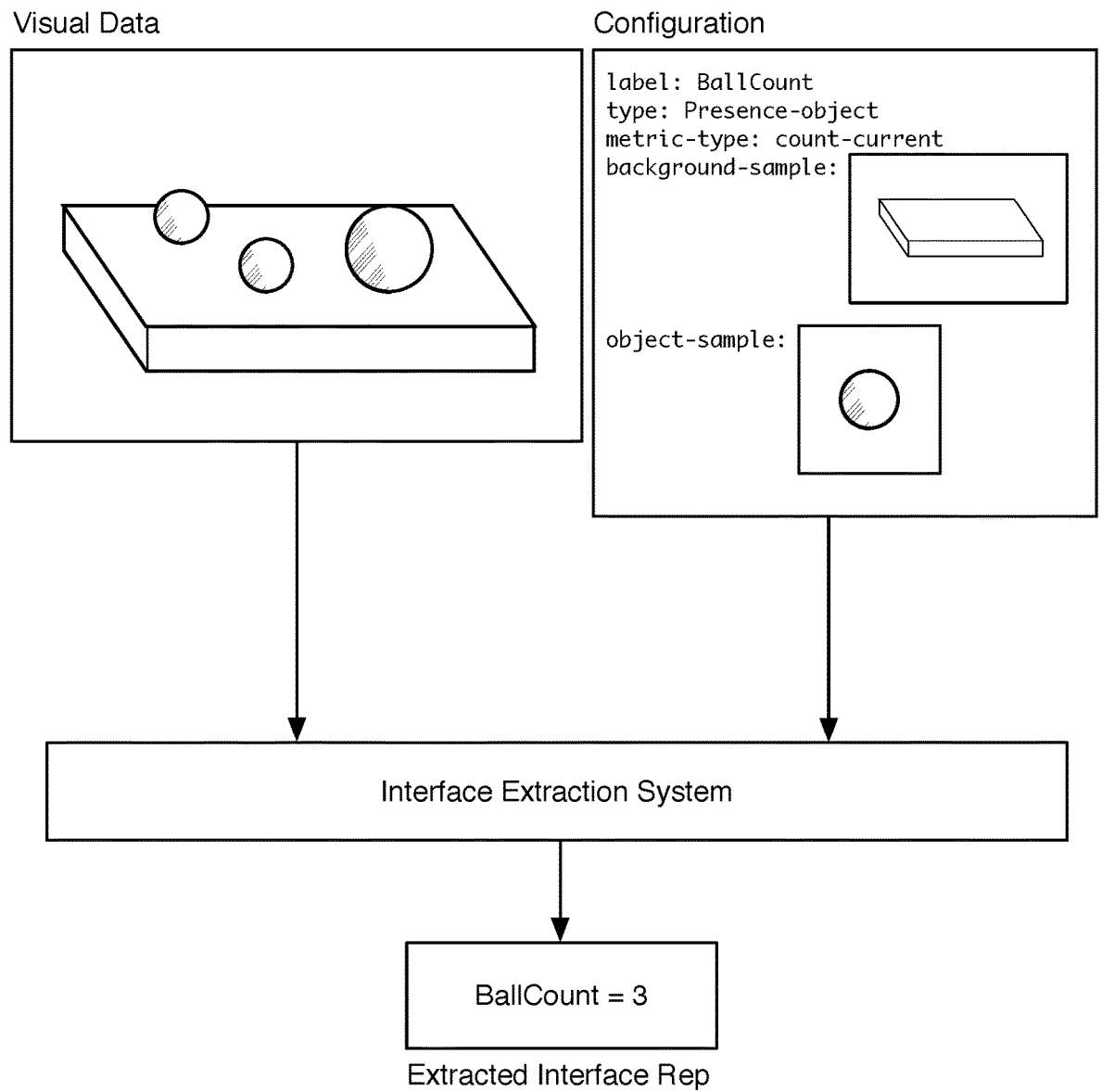
FIG. 18 is a graphical representation of the method applied to presence extraction.

As shown in FIG. 18, configuring presence extraction can involve setting a background region for detecting presence and setting the conditions for a presence event. Presence extraction can be used to detect when any object enters a space. Presence can be detected by comparing the image data to image data of the background region. The background may be initially set by capturing the image data of the background region with no foreground objects. The method can additionally build an understanding of the background region over time. For example, the method could learn the visual appearance of the background region under different lighting conditions. Conditions for a presence event can be a set of conditions based on properties of foreground objects. Properties of foreground objects can relate to the size of the object, the shape of the object, the visual texture of the object, the color of the object, or general appearance of the object. In one implementation, image recognition is performed on a foreground object. Presence extraction can be set to indicate if one or more types of objects are present. In one variation, configuring presence extraction can include setting the set of detected object classifications. The set of object classifications may be selected from a set of possible object classifications. In one variation, a customized deep learning neural network model for object classification of a set of objects may be used. Facial or biometric classifications can additionally be used in detecting presence. Presence extraction may alternatively be configured to count the number of objects present currently or over time. Presence extraction can additionally be used with other forms of physical state detection such that color profiles, size, shape, and/or other detectable attributes can be collected in addition to or in response to detection of some object presence.

In some cases, presence detection may be applied in combination with other types of extraction and/or other data collection processes. For example, different tasks or processes may be conditional on detecting (or not detecting) one or more objects. In this way presence may provide context to other forms of data extraction and processes. For example, changes in a light switch may be conditionally extracted when a human is present in the image data.

Presence detection can additionally be applied in a movable device variation, where the location of a device interface source may not be known or static. Presence detection can be configured such that block S130 can enable detecting one or more configured objects and, in response, collecting data (i.e., contextual data). Collecting data in one variation can be performing some type of interface extraction. The interface extraction can be set through extraction configuration that is associated with the object or objects. For example, character extraction can be configured to extract the time displayed on a parking meter when the parking meter object is detected. Collecting data in another variation can include recording of metadata at the time of detecting the at least one type of object and associating the metadata with the extracted interface representation. Metadata may include location, position, position of the object, time of day, audio data, application state of a device, and/or other forms of data collectable from the imaging device, an application/device in connection with the interface extraction system, a third-party service, and/or any suitable source. In one example, presence extraction can be used to detect car keys and to record geographic location upon detection of the car keys. In this way, a user could configure a movable camera (e.g., a wearable camera) to track the last location where the car keys were seen.

Figure 19:
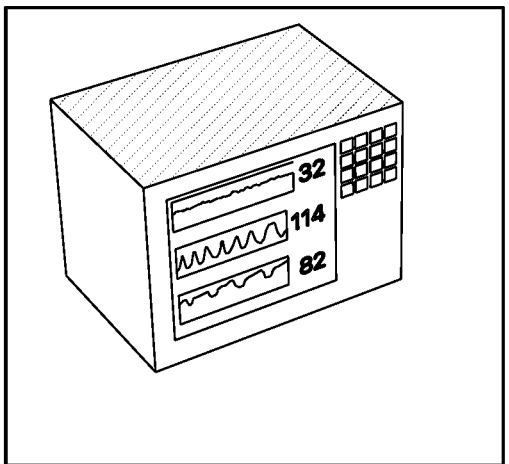
FIG. 19 is a graphical representation of the method applied to device model extraction.

As shown in FIG. 19, configuring operating properties of a device model extraction may include setting device model options. In one variation, a number of device models are provided for interpreting stateful computing devices and their respective device states. In this option, configuring the operating properties of a device model may be simply selecting one of the device models and selecting data extraction information options that are of interest for a particular application. Alternatively, a device model can be specified through a device model profile, application, or other programmatic specification of the device states and directions on how to extract information from the image data during different device states. As a stateful device, a device interface source may present different information in different ways in different conditions. Device model extraction will generally use multiple variations of the above forms of extraction in setting how to extract information data from image data. For example, character recognition in combination with indicator detection may be used to extract different data feeds of information where it is intelligently extracted and associated with a data feed based on detected indicators. Audio interface signals may additionally be used.

Figure 20:
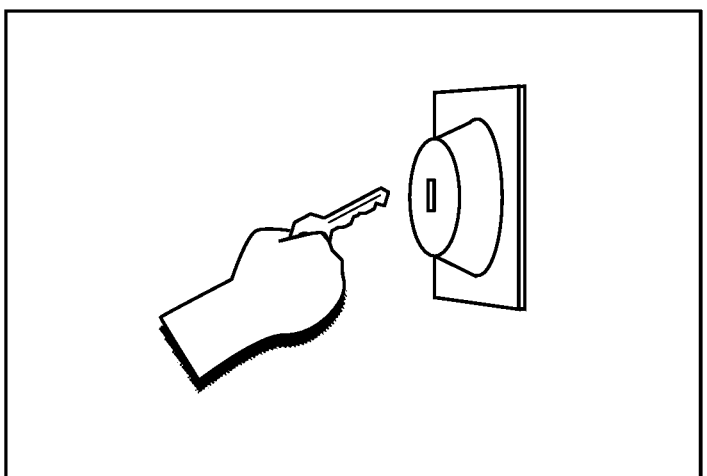
FIG. 20 is a graphical representation of the method applied to gesture extraction.

As shown in FIG. 20, configuring gesture detection can involve selecting a detectable gesture and/or gesture conditions. In one variation, a gesture extraction mode can be a basic form of presence detection where a gesture is generalized to proximity of two or more detectable objects. Alternatively, particular actions may be trained and detectable a computer vision model. Gestures may be actively performed actions for input, but could alternatively be natural actions that can be interpreted as a gesture. Hand gesture, facial expressions, or other actions can be detectable forms of gestures. Custom gestures, actions, or events could be trained and used for a particular gesture extraction. Gesture detection may be reactive to presence detection. However, gestures may alternatively be linked to detection at a particular position. In one exemplary application, the gesture of locking a door lock with a key may be a detectable gesture. The physical action of locking may be detectable through computer vision. Alternatively, gesture detection could be composed of detecting presence of a person, a key, and the lock within some threshold of near proximity and/or making contact.

Block S124, which includes registering visual markers on a device interface source, functions to use visual markers in facilitating configuration. The visual markers could be stickers, marks, or attachments that can be physically added to the device or otherwise augment how the device is perceived. The visual markers are preferably visually distinct and made of a distinguishable color and/or graphical pattern. Additionally, the visual markers could have a machine readable code such as a QR code or a barcode. The machine readable code is preferably set to an identifier. The identifier can be used to indicate different things such as the purpose and meaning of the marker and how it should relate to extracting information.

Two preferred variations of using visual markers can include using the visual markers in specifying at least a portion of extraction configuration and/or using positioning of visual markers in setting at least a portion of operating properties. As discussed above, a pairing mode is another potential application of visual markers, but they may alternatively be used in other ways.

Figure 21:
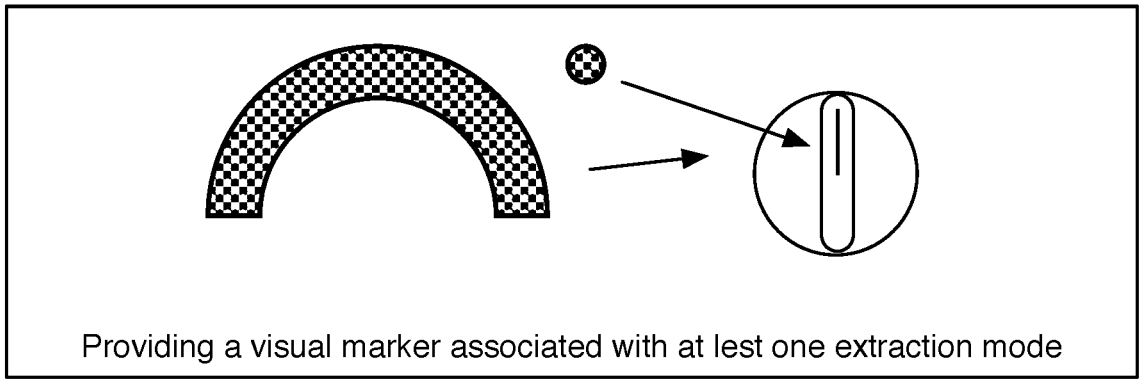
FIG. 21 is a schematic representation of an exemplary process using visual markers.
Figure 21:
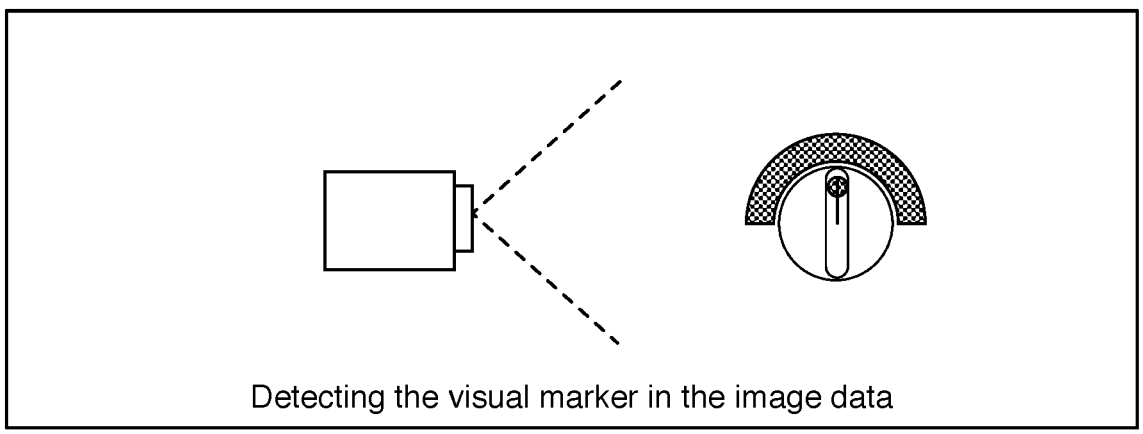
Figure 21:
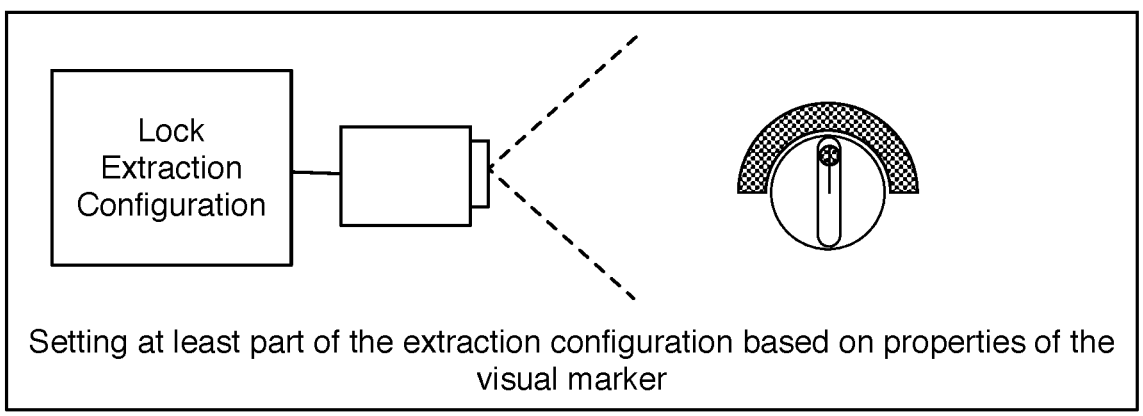

In a variation where visual markers are used to specify at least a portion of extraction configuration, visual markers may be placed on different device interface sources where the visual markers indicate extraction configuration. Detection of a visual marker can indicate position of a device interface source but may additionally indicate an extraction mode. Accordingly, the method can include providing a visual marker associated with at least one extraction mode, detecting the visual marker in the image data and setting at least part of the extraction configuration based on properties of the visual marker, wherein position, extraction mode, and/or device interface operating properties can be set as shown in FIG. 21. In one variation, the visual markers may visually represent an identifier. The identifier can be used in accessing extraction configuration associated with that identifier. The identifier can be unique such that the extraction configuration can be uniquely customized. The identifier may alternatively not be unique where it can reference an extraction configuration that can be shared across multiple device interface sources. Alternatively, the visual markers may represent some visually encoded message that embeds the extraction configuration properties. In this variation, the visual marker may be used without needing access to a database of associations. In this variation, common extraction configurations may be associated with visual markers that can then be positioned or attached to different device interface sources of interest. Image data containing that capture the visual marker will then be automatically processed using the extraction configuration.

Figure 22A:
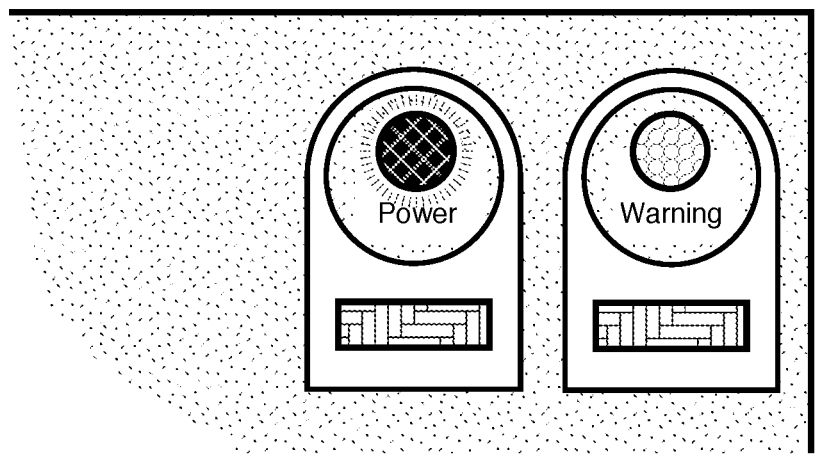
FIGS. 22A-22C are schematic representations of visual marker stickers used for configuration and detection.
Figure 22B:
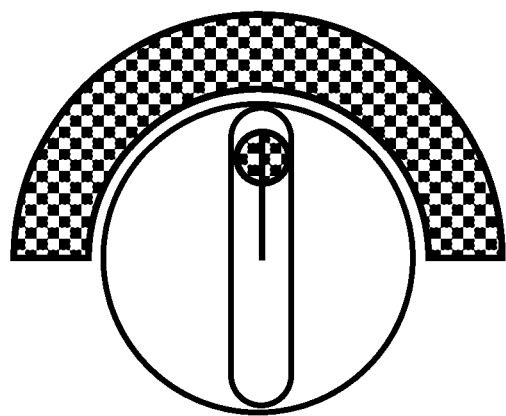
Figure 22C:
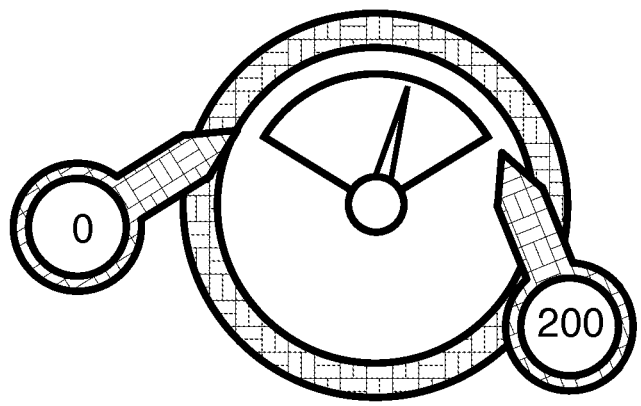

In another variation, visual markers may be used in marking different aspects to assist in the extraction of information. This variation preferably leverages different visual markers to augment a device interface source so as to make it more easily or reliably interpreted. This variation may include providing a set of visual markers, such that the combined positioning of the set of visual markers as detected in the image data at least partially define extraction configuration of the device interface source. Visual markers may have attributes to specifically configure particular aspects of extraction configuration. Different types of visual markers may be used to configure the position of a device interface source, the type of extraction, and operating properties as shown in FIGS. 22A-C.

A position setting visual marker may be used to mark where a device interface source is located and possibly set the dimensions of associated image data. A position visual marker may be a box that can be placed to circumscribe a device interface source. Other systems of a visual marker could alternatively be used.

An identifier on the visual marker may indicate the type of extraction to be used. Element visual markers may be used to characterize the operating properties of the device interface source.

Operating property visual markers may be used to specify different operating properties. The positioning of a property visual marker can convey some information used in setting an operating property, the type or label of an operating property visual marker may additionally be used. For example, a min-value visual marker and max-value visual marker may set the range of a dial. An operating property visual marker may additionally include variable fields where information can be included to set variables. These may be used in combination to set multiple operating properties. For example, dial-based visual markers may visually mark the minimum value, intermediary values, maximum value, orientation of an indicator, path of the indicator, and/or any suitable operation property.

Figure 23:
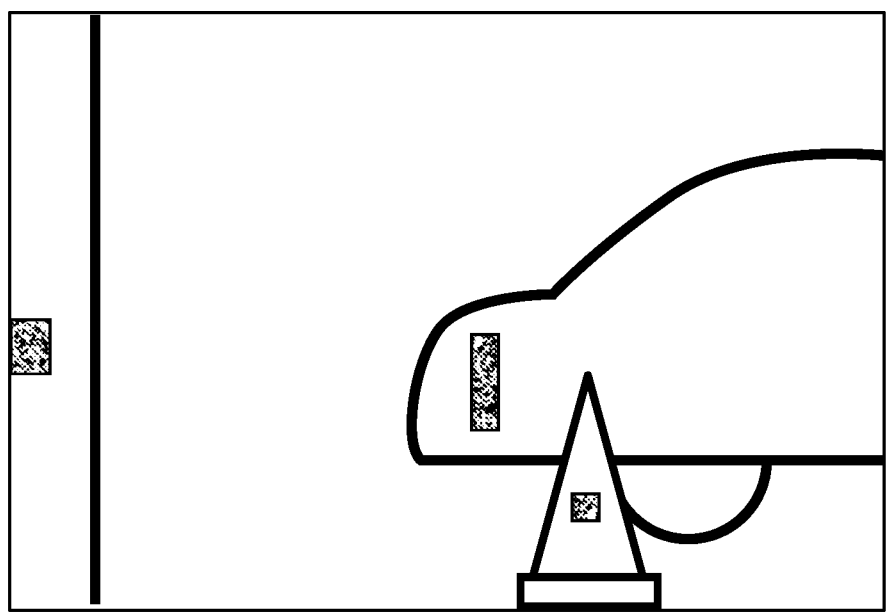
FIG. 23 is a schematic representation of a device augmentation to convert device interactions into an interface output.

Once placed, visual markers are preferably detected and used to automatically configure aspects of the device interface source. The visual markers can act as a physical approach to normalizing detection of different types of devices. They may additionally be used to artificially make particular device(s) be perceived as a different type of device. For example, dial extreme markers can be placed on a cone and wall of a garage with another marker on the front of a car to convert a car pulling into a garage as a progress bar dial as shown in FIG. 23.

Figure 24:
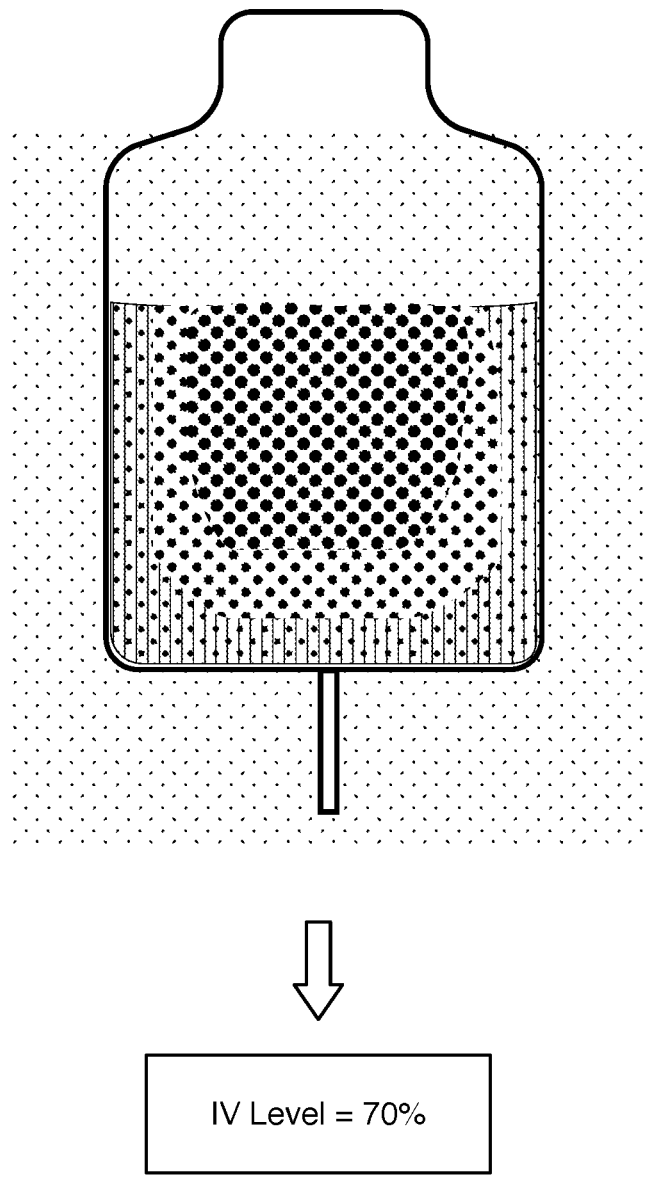
FIG. 24 is an exemplary schematic representation of interface output extraction applied to an IV bag.

In another exemplary application, the method could be applied to an IV bag. The IV bag could be a common IV bag such as a drip or pump system, which enables existing equipment to be used. The IV bag may be augmented to enhance the fluid level presence. In one variation, a light could be used to illuminate the fluid to enhance detecting its level. In another variation shown in FIG. 24, a graphical pattern could be place in the background. The optical disruption of the pattern caused by the fluid could be differentiated from disruption caused by just the bag, and the fluid level could be derived from this observation.

Visual markers could similarly be applied to other applications of monitoring liquid contents of an at least semi-transparent container. For example, bottles of liquid could similar be monitored. A visual marker strip could be adhered to the back of the bottle. Alternatively, a visual marker background could be positioned such that the bottles of interest are the visual marker background and the imaging device. The visual graphical pattern in this variation may be a graduated pattern with continuous or discrete segments of different identifiable levels. The level of the liquid can correspond to marked liquid levels based on the detection of a graduated pattern.

In a similar variation that does not utilize augmentation the method could learn the background visual representation and use a similar approach to optical disruption to identify the fluid level.

Figure 25:
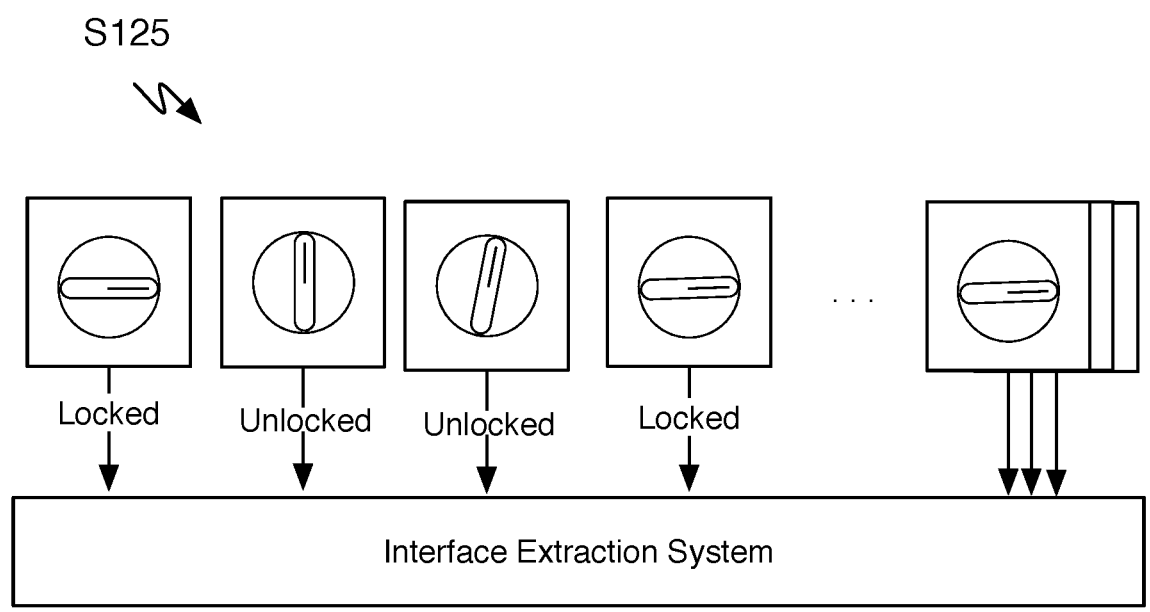
FIG. 25 is a schematic representation of training extraction of the device interface source.

Block S125, which includes training extraction of the device interface source, functions to use machine learning in understanding the informational classification of image data as shown in FIG. 25. Training could be performed during an initialization process, but may additionally or alternatively be performed during operation. Training preferably involves collecting a training set of image data and generating a model for associating the image data of a device interface source with various values. The training may be beneficial in scenarios where the device interface source does not perfectly map to one of the available types of extractions. Training may be an alternative approach to configuring. For example, instead of setting up how a dial works, a user could show the imaging device a number of possible dial positions and input their associated values. The interface extraction system can alert the user when enough samples are collected. The interface extraction system does not need to have samples for a full set of possible values because, the method could interpolate the visual detection of un-trained values. The training and automatic detection of device state can be performed using computer vision, deep learning, neural networks, and/or other suitable forms of machine intelligence.

Block S130, which includes processing the image data associated with the device interface source into an extracted interface representation according to the extraction configuration, functions to interpret the device interface source. As discussed, one or more device interface sources can be extracted simultaneously from the image data. Additionally, one device interface source may have one or more types of extraction applied to the image data of that device interface source. In some cases, this may result in multiple data streams of extracted interface representation. An extracted interface representation is preferably a data object that reflects the state of the device. Various embodiments of the method may provide one or more types of representations such as a rendered interface representation, a parameterized interface representation, a classified interface representation, and/or any suitable analyzed representation.

A rendered interface representation can be a virtual rendering or an image-based rendering of the interface. The rendered interface representation can provide a visual representation. An image-based rendering can be a formatted version of the device interface source as captured in the image data. An image-based rendering may be saved and used to provide the base truth of the state of device interface source. A virtual rendering can be a simulated visual representation that can be constructed from a parameterized or classified interface representation. A rendered visual representation in some applications can be streamed or provided as a visual representation to accompany a machine translation of the information.

A parameterized interface representation can be a machine-readable representation of the interface. In some variations, an initial form of parameterized interface representation can be a conversion of image data of a device interface source to a data representation. This can include reducing the components of the interface into its base components. An example for a dial device interface source would be the dial angle and position relative to the dial range. Those parameterized representations of the base components may then be converted to a classified interface representation. A classified interface representation is preferably achieved through characterizing informational data from a base parameterized representation. In some cases, processing of the image data may bypass any intermediary form by using image classification, feature extraction, or other CV-based approaches. Alternatively, the parameterized interface representation of base components may be used as inputs used in generating the classified interface representation.

The classified interface representation, or in other words an informational data representation, is a type of a parameterized interface representation data format that provides the symbolic meaning of the interface and is generally what an informed user would interpret from viewing the device. In the dial example used above, the classified interface representation would be the indicated value of the dial.

An analyzed representation can be a higher order data information format resulting from applying high level logic, statistical analysis, and/or understanding of the information conveyed in the device interface source. The analyzed representation can be the result of applying high level logic and processing of the information as applied to the extracted interface presentation, and may use historical data, other data sources, and/or other resources in performing the analysis.

Figure 26:
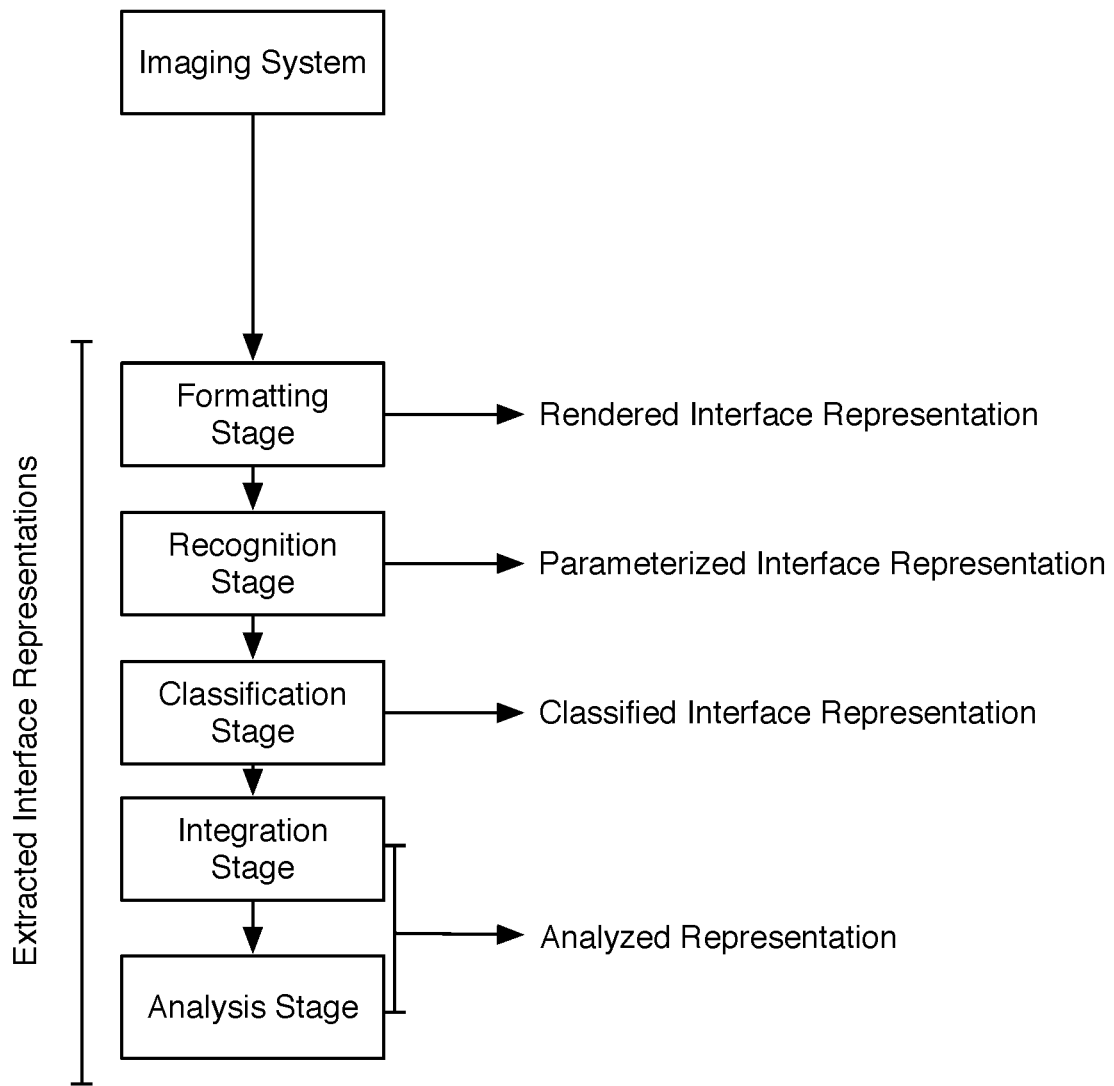
FIG. 26 is a flowchart representation of a processing pipeline.

One or more of these extracted interface representations may be exposed as shown in FIG. 26. In one preferred implementation, the extracted interface representation can expose a classified interface representation and the image-based rendered interface representation so that the ground truth of the classified interface representation can be inspected.

The extracted interface representation is preferably stored in association with a timestamp and can be periodically updated such that a longitudinal history of an extracted interface representation can be established. In some cases, however, a single or set of isolated snapshots of an extracted interface representation may be produced. As the extracted interface representation may not be collected with at regular intervals, data flagging or eventing may be triggered in response to issues in generating an extracted interface representation.

The processing of the image data may be scheduled such that it is executed at set intervals. The processing of the image data may alternatively be responsive to detection of the device interface source. A device interface source detection process can be executed continuously or periodically on the image data, and upon detection of the device interface source, the image data can be appropriately processed. This can be particularly applicable to variations using a movable imaging device, where the device interface source may not always be present or located in the same region. The processing of the image data may alternatively be triggered through some input. For example, when integrated with a digital camera, the processing can execute after capture of the image data. In another example, a programmatic command may be communicated to an imaging device to capture image data and process the image data.

Figure 27:
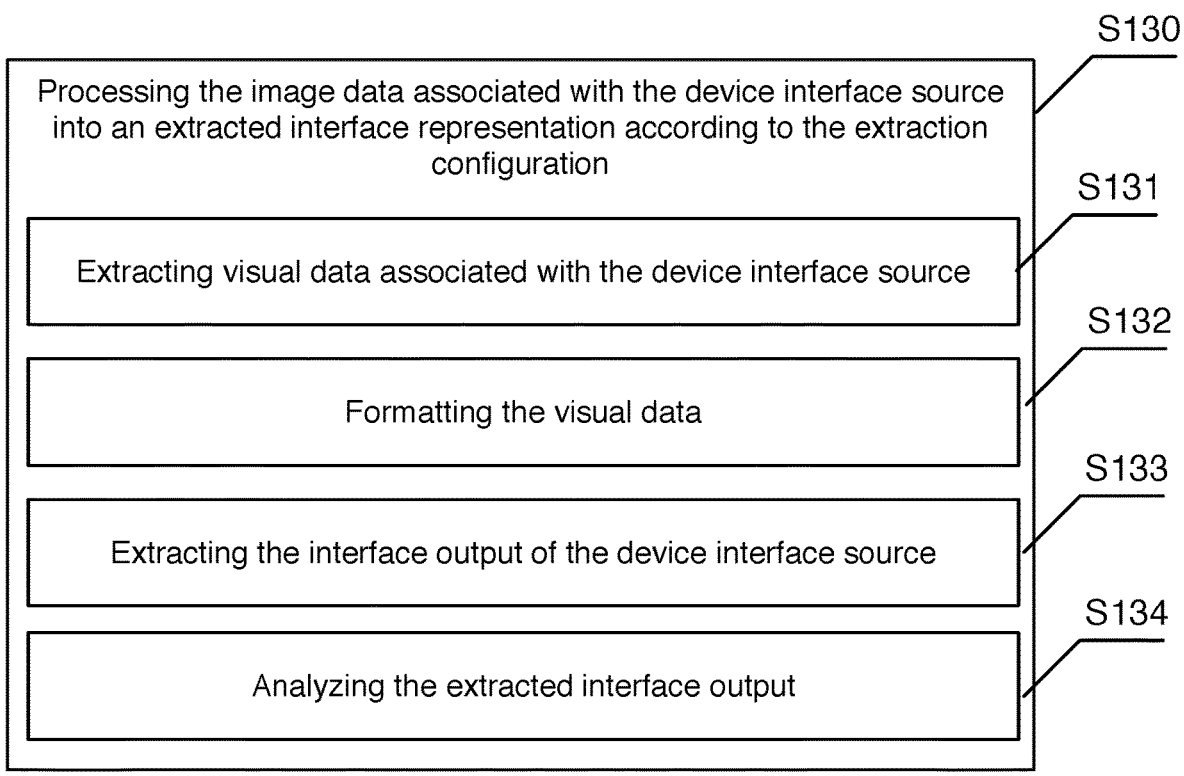
FIG. 27 is a detailed flowchart representation of processing the image data.

Processing the image data can include a number of processing stages, which may involve a visual formatting stage, recognition stage, classification and data formatting stage, and/or analysis stage. Accordingly, processing of the image data can include extracting image data associated with the device interface source S131, formatting the image data S132, extracting the interface output of the device interface source S133, and/or analyzing the extracted interface output S134 as shown in FIG. 27.

Block S131, which includes extracting image data associated with the device interface source, functions to isolate the image data associated with the device interface source. Multiple cropped segments of image data can be created from the image data if multiple device interface sources are present.

In some variations the position of the device interface source is substantially static and configured in the extraction configuration. The selection of a sub-region of relevant image data can be directly performed based on the configured position of the device interface source.

In other variations, block S131 may include detecting a device interface source and the position of the device interface source. This may be achieved through object recognition using CV-based approach. This could alternatively be achieved through detection of a visual marker or other suitable approaches.

Block S132, which includes formatting the image data, functions to prepare, normalize, and/or rectify the image data as part of the visual formatting stage. In some variations, the image data transformations prepare the image data for subsequent stages of processing or for a rendered interface representation. The formatting the image data may additionally be used in generating a rendered interface representation that can be part of the extracted interface representation output.

Various visual transformations can be made including geometric transformations and imaging transformations. In one basic form of formatting the image data, the image data can be cropped to a region of interest for the device interface source. For example, the image data may be converted to one or more sub-images that are cropped to some bounding box around the device interface source or some region of interest for the device interface source. The visual transformations are preferably specifically customized for regions of image data associated with different device interface sources such that each device interface sources can be normalized into an extracted interface representation. If there are two or more device interfaces sources captured by a camera, each device interface source can be transformed individually. Image data transformations are preferably applied directly on the image data, but can additionally include altering the configuration of an imaging device to transform image data though altering the image data collection process.

Geometric transformations can rotate, skew, distort or otherwise morph the geometry of one or more regions of the image data of an interface to account for perspective. Accordingly, the viewing angle of a device interface source can accommodate rotation and non-normal viewing perspectives. For example, screens viewed off angle are transformed to remove key-stoning in order to produce regular rectangular images with aspect ratios that might match that of the screen of the original device. The amount of visual transformation can additionally be used to characterize the quality of the collected data (i.e., the capture status). For example, a screen viewed from an extreme angle (e.g., eighty degrees off of a straight-on view) may be less reliable. Reliability of the source of the extracted interface representation can be stored as a quality data property. The data property can depend on the base image data and/or other aspects such as confidence in translating image data to a parameterized value.

Other visual transformations can include imaging transformations, which functions to adjust the color space of the image data for enhanced legibility and/or processing. As with other image data transformations, imaging transformations can be customized to different regions of the image data. Imaging transformations can include adjusting the color space, brightness, contrast level, saturation level, hue, sharpness, white point, black point, and/or altering any suitable imaging variable. Filters or other image transformations may additionally be performed. The type of imaging transformations can be based on the type of extraction.

Block S133, which includes extracting the interface output of the device interface source, functions to convert image data related to the device interface source into some form of a parameterized interface representation. A parameterized interface representation preferably includes a classification and data formatting stage wherein a classified machine readable representation of an interpretation of the device interface source is produced. For example, the image of a dial can be converted to the interpreted meaning of the observable dial setting. In some variations, extracting the interface output may additionally include a recognition stage where components of the device interface source are detected. For example, a parameterized description of the position of the dial and the range of the dial in a generic description.

Figure 28:
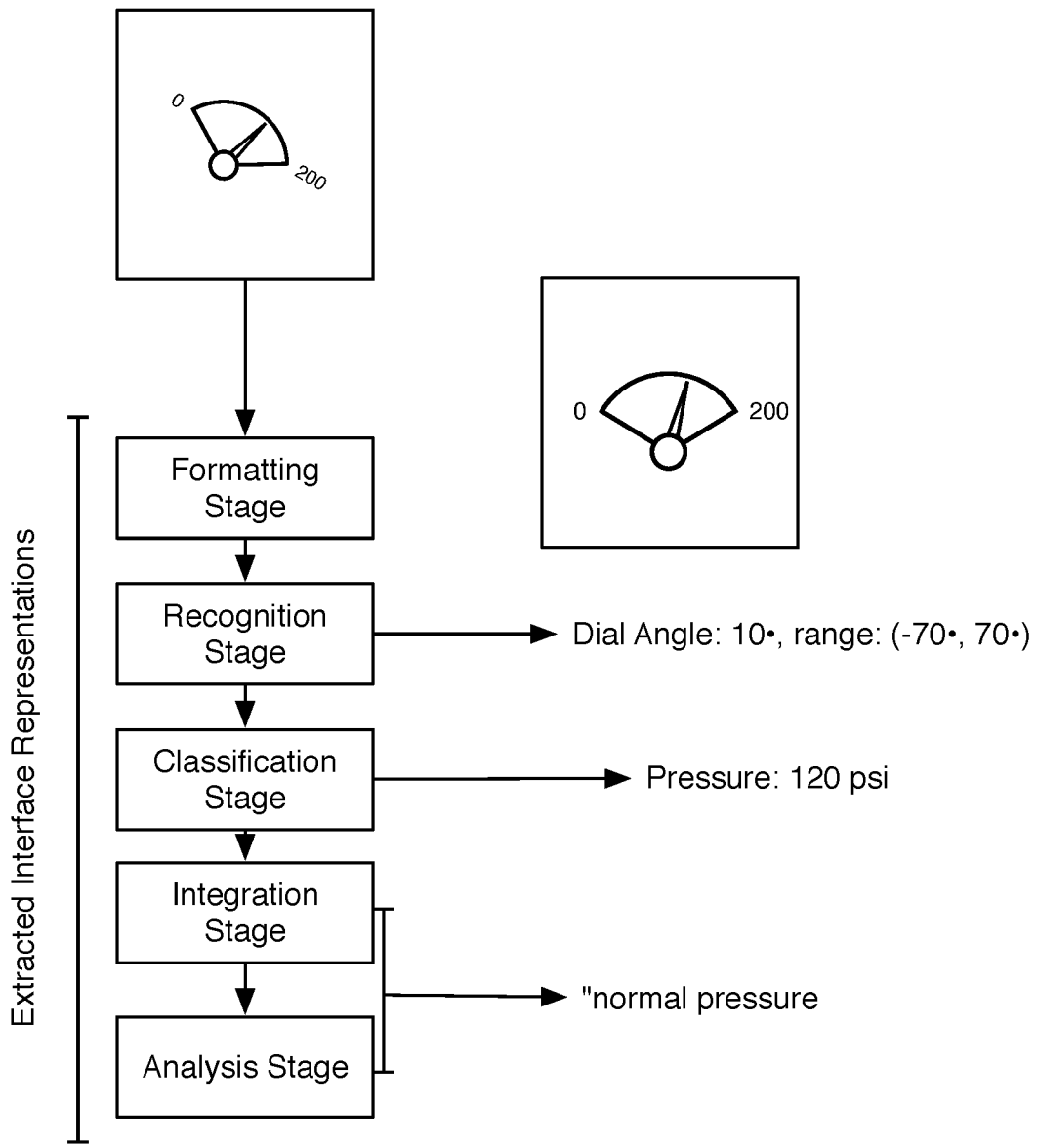
FIG. 28 is a flowchart representation of an exemplary processing pipeline for a dial.

In a recognition stage of extracting the interface output, visually represented information is preferably converted to a base parameterized interface representation. Accordingly, processing the image data may include extracting a parameterized representation of the formatted image data. The parameterized interface representation can be used in providing a lower-level interpretation of the device interface source in between performing image processing and obtaining a classified interface representation. A base parameterized interface representation is a parameterized data representation of a visual description of the interface. In one variation, the parameterized interface format of a device interface source can be a data object with an array of graphical elements where each graphical element can have detected text, color properties, a location property, size properties, orientation properties and/or other properties. The properties of a data object for a base parameterized interface representation may depend on the type of extraction. For example, a segmented character display can include a first set of properties and a dial can have a second set of properties. Alpha/numerical characters are preferably recognized through optical character recognition (OCR) techniques or other processing techniques. A dial may be represented as an angular or linear position of the dial indicator as shown in FIG. 28.

In a classification and data formatting stage of extracting the interface output, the nature of the device interface source is interpreted into a classified interface representation also referred to as informational data. The classified interface representation is a data format that provides the symbolic/informational meaning of the interface and is generally what an informed user would interpret from viewing the device. A classified interface representation is preferably achieved through characterizing informational data from a base parameterized representation.

A base parameterized interface format may be used to determine the symbolic meaning of the interface output. In one variation, a parameterized representation of the image data can then be characterized into a classified data representation, which provides more informational data that reflects the conveyed information as opposed to a parametric description of the appearance of the interface. Alternatively, the image data may be used directly such as when using computer vision and machine intelligence to classify the meaning of the image data. The base parameterized interface format preferably represents the main components that define the mechanics of how the device interface source operates. The base parameterized interface representation can be logically analyzed to generate the classified interface representation. For example, a dial may have a minimum value representing zero at a first location, a maximum value representing 100 at a second location, and an indicator currently at a third location halfway between the minimum and maximum. This exemplary parameterized interface representation can be converted to a classified interface representation of fifty. The base parameterized interface representation may alternatively be used as input for machine learning analysis.

The units assigned in the classification stage may be dynamically determined from the presented interface output but could alternatively be pre-configured during block S120. For example, a user may specify that the number characters read on a digital character display represent the temperature in Fahrenheit. Additionally formatting rules can be set to appropriately format the parameterized interface representation.

In one implementation for a type of extraction, computer vision classification may be applied in translating from image data to an extracted interface representation and more specifically a classified metric representation. As one potential solution for extracting an interface representation, the method may apply deep learning, neural nets, and/or other forms of machine learning models that are trained to translate image data of a type of user interface to its interpreted meaning. The interpreted meaning can be normalized and then extraction configuration can be used in scaling that to the intended interface output. For example, the positions of a radial and/or linear dial may be trained so that a normalized position or angle of the dial can be detected through a neural network. Then the configured scale of the dial (e.g., linear/logarithmic, value range, etc.) can be used to convert the normalized position or angle to a data value. Other interfaces may be interpreted through deep learning where the visual appearance has a mapping to interpreted meaning. In the example above, the image of a dial may be classified as having a higher correlation to a set of images known to have a particular symbolic mapping.

The various types of configurable extraction modes may have specific processing steps customized to interpreting each type of interface.

In a physical state detection mode, processing the image data associated with the device interface source into an extracted interface representation can include parameterizing visual physical state of the device interface source into an extracted interface representation. Parameterizing the visual physical state can include calculating size, tracking shape, tracking color profile, tracking orientation, tracking position within a region, and/or tracking other attributes of the physical state of an object. In some instances, the device interface source is static, in which case the physical state can be processed when the device interface source is visible. In other instances, the device interface source may apply physical state detection upon detecting presence of a particular object. The physical state properties that are parameterized may be conditional based on the present object in a region of the device interface source.

In an indicator detection mode, processing the image data associated with the device interface source into an extracted interface representation can include parameterizing the indicator state of at least one indicator signal. One preferred type of indicator is lighted indicator signal in which case the illumination state is parameterized, which may include parameterizing stable state of an indicator, parameterizing time varied states, parameterizing illumination qualities, and the like. This can include detecting an on and off state. There may additionally be other states. In one variation, the indicator state may be communicated through state variations over some window of time. For example, a certain number of flashes or rate of flashing can be detected and mapped to a configured state. Color, brightness, and other illumination qualities of an indicator may also be detected and classified as different states. An indicator detection mode may additionally be used for physical indicators like switches, buttons, graphical indicators. In one variation, multiple indicators may as a collection indicate different information, and parameterizing can include parameterizing the collective state of the indicators. For example, three indicator lights may turn on and off in different combinations to signal different information which could be interpreted through logic in the extraction configuration.

A switch extraction mode may be a type of indicator extraction. In a switch extraction mode, processing the image data associated with the device interface source into an extracted interface representation can include parameterizing the mechanical state of a switch. The switch will preferably have at least two mechanically stable states, but could alternatively have multiple stable states. Multiple switches could additionally be monitored to determine some logical state. With switches and indicators, the change in state at times may be of interest in addition to or as an alternative to just the stable state.

In a dial extraction mode, processing the image data associated with the device interface source into an extracted interface representation can include parameterizing the settings of a one-dimensional dial. This functions to measure the position of a dial indicator relative to the operating range along one dimension. In a rotary dial this may include measuring the angle of the dial indicator. In a linear dial this may include measuring the position of the dial indicator along a linear path. Accordingly, this may include detecting the dial indicator and measuring position and/or orientation relative to the dial range. Dials can include dials that are set into a position by user input as well as dials that are set in response to some signal. The dial extraction mode can additionally be applied to many situations that don't involve a traditional dial such as treating the level of contents in a container or bottle as a dial indicator that moves linear along the path defined along the container. A multi-dimensional dial or user input like a joystick with two-dimensions of positioning or another element could additionally be extracted.

In a character extraction mode, processing the image data associated with the device interface source into an extracted interface representation can include performing optical character recognition in a designated region.

Related to character extraction, the method could additionally include other forms of graphical interpretation that more generally includes parameterizing graphical state of image data of the device interface source, which functions to interpret graphical presentation of information in an interface output. In a basic variation, this may be through identification and classification of static or animated graphics. Such graphic classification can enable graphical interpretation of non-alphanumeric symbols such as logos, icons, infographics, symbols, and/or other visual objects or patterns. Parameterizing graphical state, in one variation, may be used in parameterizing a chart (e.g., a line graph, pie chart, bar graph, or other form of infographic) into a dataset. In the variation of interpreting a chart, interpreting the graphical representation may include identifying a graphic type, detecting dimensions, identifying at least one data-set indicator, and generating at least one data-set value through comparison of a data-set indicator to the dimensions according to the graphic type. Graphic type can specify the rules for how data-sets and dimensions are represented and how a data-set indicator should be evaluated according to the dimensions. A pie chart will have rules on angular interpretation of wedges, and a line chart will have rules on interpretation of a line plotted along a two-dimensional axis. In the case of a medical monitoring device, a biological signal reflected as a line graph can be translated into a time series data-set.

In a presence extraction mode, processing the image data associated with the device interface source into an extracted interface representation can include detecting at least one type of object in a region specified in the extraction configuration. Detection of an object can include various forms of CV-based object detection. When dealing with people or more uniquely identifiable objects, presence extraction can be used for unique identification of objects. In the case of people, facial recognition, and/or other forms of biometric identification may be used. Presence detection mode may additionally include counting objects, measuring the quantity, timing the duration of presence, or generating other metrics related to object presence. Multiple types of objects may be detected. In some cases, presence extraction is used in detecting presence of some combination of objects in a region. Presence detection may additionally be accompanied by physical state detection.

In a device model extraction mode, processing the image data associated with the device interface source into an extracted interface representation can include detecting device state of the device interface source, and processing the image data according to a detected device state. The device model extraction mode functions to interpret device state of a device interface source. The device state is preferably detected according to a selected device model extraction mode set in the extraction configuration, wherein the selected device model extraction mode is on specifically for the particular device model of the device interface source. For example, each brand and model of heart monitoring device may have a different customized device model extraction mode to accommodate the different forms of data, device states, and device state transitions Processing the image data according to a detected device state can include selecting a type of informational data for characterization based on the detected device state. Depending on the device state, different data (or lack of data) may be exposed through the interface. Processing the image data according to the detected device state can additionally include extracting a parameterized representation of the device interface source from the image data and characterizing the parameterized representation into a labeled, informational data.

The device state will generally change the type and form of information presented by the device interface source. Device state can be detected by interpreting device state from device indicators, tracking user interactions, and/or other approaches. Device indicators may include physical indicators like buttons, switches, LEDs, dials, and the like. Device indicators may additionally include graphically displayed indicators such as GUI menu labels. In one variation, the method can include generating a device state model based on display images labeled as different device states. In this way small graphical styles of different device states (e.g., different applications, GUI widgets, and the like) can be efficiently learned and represented as a model for classification. In a particular device state information is preferably presented in different ways. Each device state may have different information that can be extracted. Maintaining a state machine of device state may additionally be used to associate information across different device states. For example, the method can interpret the navigation of a hierarchical menu in a modal operating system to understand classification of data extracted from a particular view.

Block S134, which includes analyzing the extracted interface output functions to perform post processing on the extracted interface representation. Depending on the application, different forms of analysis may be applied. More generally, basic analysis post-processing processes can be configurable such as averaging over a window, converting a rate of change or acceleration of a metric, or other basic processes. In some variations, the analysis may additionally include integrating with one or more other data sources, which may enable more in-depth analysis.

The various types of extraction can additionally include other processing features to account for different operating attributes of a device interface source. Indicator interfaces may also communicate information through a sequence of blinks. These sequences could be configured for detection, and block S130 could automatically detect these blinking conditions. Dial devices may offer the ability to move the dial continuously or more than a full rotation. Processing of a dial that is configured indicating such rotation range may be specifically tracked to account for being rotated beyond. Continuous tracking of the indicator may be used. Character based devices may operate with varying mechanics. A character-based display may scroll horizontally, scroll vertically, or cycle through messages. Such display changes could be automatically tracked and accounted for in the processing stage to create better-structured data. Other device mechanics could additionally be accounted for.

Additionally, during execution of the method, there may be gaps in the monitoring a device interface source. The device interface source may be undetectable because the view is blocked, the lighting conditions change, the device interface source is temporarily moved, or other complications. The method can preferably account for inconsistent data collection. The reason for a capture status change could be classified. Collected extracted interface representation data could be annotated indicating the capture status. Additionally, configuration for extraction of device interface source could be set to send a notification or issue an alert during particular capture status conditions.

Block S140, which includes exposing at least one access interface to the extracted interface representation, functions to utilize the information obtained from the devices. The method could be applied in a variety of use cases, and the type and manner of exposing an interface could be different depending on the use case. The exposed interface could be a user interface or a programmatic interface. The user interface could be accessed via a native application, a web application, or any suitable type of graphical, visual, or auditory user interface. Additionally, the user interface could be facilitated through a communication channel. Notifications and alerts could be triggered based on different conditions of the extracted interface representations. For example, an alert could be sent to one or more recipients in response to the classified interface representation satisfying some condition (e.g., heart rate dropping below a set value). A programmatic interface could be an application programming interface, a data communication protocol, a data storage solution, application processing routine, and/or any suitable mechanism enabling programmatic interactions. The programmatic interface can enable other applications and services to be integrated with the interface extraction system.

A programmatic interface to the extracted interface representation(s) can be used to build various sets of tools and/or services. A programmatic interface may include storing the extracted interface representation and providing API access. Exposing at least one access interface to the extracted interface representation could include exposing an API to a historical data record of the information data. In another variation, the extracted interface representation could be directly communicated to another system or application. For example, a digital assistant, electronic product, or other form of device or product could be directly sent the extracted interface representation. In some variations, the extracted interface representation can be converted to a control line so that the state of another connected system can be controlled in response to the extracted interface representation.

In another variation, exposing an interface can include streaming a rendered interface representation. A user interface of the interface extraction system can be provided that organizes one or more device interface sources for remote monitoring. The rendered interface representation can additionally be streamed and/or accessed by multiple distinct parties. In one variation, the rendered interface representation includes at least part of the image data. The image data is preferably processed by at least a formatting stage. Intelligent streaming could include only transmitting changes of the device interface source. In another variation, the rendered interface representation can be a virtual rendering of the interface that is driven by data extracted from the device interface source. The data could be in a parameterized interface representation, a classified interface representation, or data from higher-level analysis.

When applied in an industrial application where multiple device interface sources may benefit from grouped human monitoring, a rendered interface representation preferably enables the monitoring of a plurality of device interface sources. The various device interface sources may be organized or categorized for group monitoring and/or analysis. Additionally, the visual or data representation of one or more device interface sources can be presented in a structured format that organizes and prioritizes appropriate information. In one exemplary use case, a rendered interface representation can be streamed to a head nurse overseeing a floor of patients in a hospital. The various device interface sources for each patient are grouped together. The head nurse can have an overview view where all patients can be monitored within one view. A patient view can enable the nurse to select a particular patient for detailed monitoring—the history of the device interface sources and/or lower priority information may be presented.

In one implementation, the method may be used in combination with a programmatic event-handling system. The event-handling system may function to process the extracted interface representation and trigger a programmatic event upon detecting an event. Various event conditions could be monitored. The event conditions may be based in part on some aspect of the extracted interface representations. Then upon satisfying the condition a programmatic event could be initiated. In another implementation, the interface to the extracted interface representation(s) could be integrated with a home automation hub wherein various IoT devices could be collectively managed. In another implementation, a user interface for remotely monitoring the device interface source could be created. A wide variety of applications and tools could be constructed using the method.

The method may additionally include monitoring the capture status of a device interface source and generating feedback in response to a change of capture status of the device interface source S150, which functions to detect and respond to problems of a device interface source being lost from view, blocked, angled to prevent accurate extraction, or otherwise obscured in the field of view of the imaging device. The feedback is preferably applied to address the changes so that actions can be taken to resolve issues.

The capture status relates to the state of image data associated with device interface source that is used in processing. The capture status could be a binary status indicating if an extracted format can be generated. In another variation, the capture status could be a reliability metric. Under ideal lighting conditions and a clear view of the device interface source the reliability metric can have a high rating. As the lighting conditions become less ideal and/or the angle of the device interface source moves off center, the reliability metric may decline. At some level the capture status can indicate that a reliable extracted interface representation is not obtainable.

Audio interface elements could additionally have a capture status. Capture status may be impacted by background noise, the volume settings of the device, the orientation of a microphone of the interface extraction system, and/or other properties.

Generating feedback in block S150 can be implemented in a variety of approaches. In one approach, the imaging device or another suitable device could generate user feedback. The user feedback could be an audio alert such as a sound or announcement. The user feedback could additionally or alternatively be a visual alert such as activating a status light. The user feedback can communicate the issues with the capture status. For example, an audio announcement may announce that the brightness settings of the display on a device need to be changed. In another example, a graphical display on an imaging device may indicate the "signal strength" based on the image data conditions.

In one preferred implementation, generating feedback can include announcing a change in capture status during user exit of the field of view. In this implementation, the method may additionally include tracking user presence in the field of view of the image data, which can enable detecting the user exit. In some cases, humans may commonly enter the field of view obscuring or altering the capture status of a device interface. While a human that causes the change is present in the field of view, the method can assume that the human is interacting with the device interface sources and performing the task of monitoring information from the device interface source. In other words, the method can temporarily delegate device interface source monitoring to a user when the user is in the vicinity of the device interface source. This can be particularly useful in a hospital use case where nurses and doctors will enter a patient's room, view the device interface sources, and interact with the device interface sources. The method may additionally be able to distinguish between different users. For example, the method can be configured to distinguish between hospital workers and other people (e.g., patients, patient family members, etc.). The appropriate users can be tracked through the image data (or other sources of location information like GPS or RF-based triangulation), and when the user leaves the proximity of the device interface source, the user can be alerted to any issues with the monitoring conditions.

Figure 29:
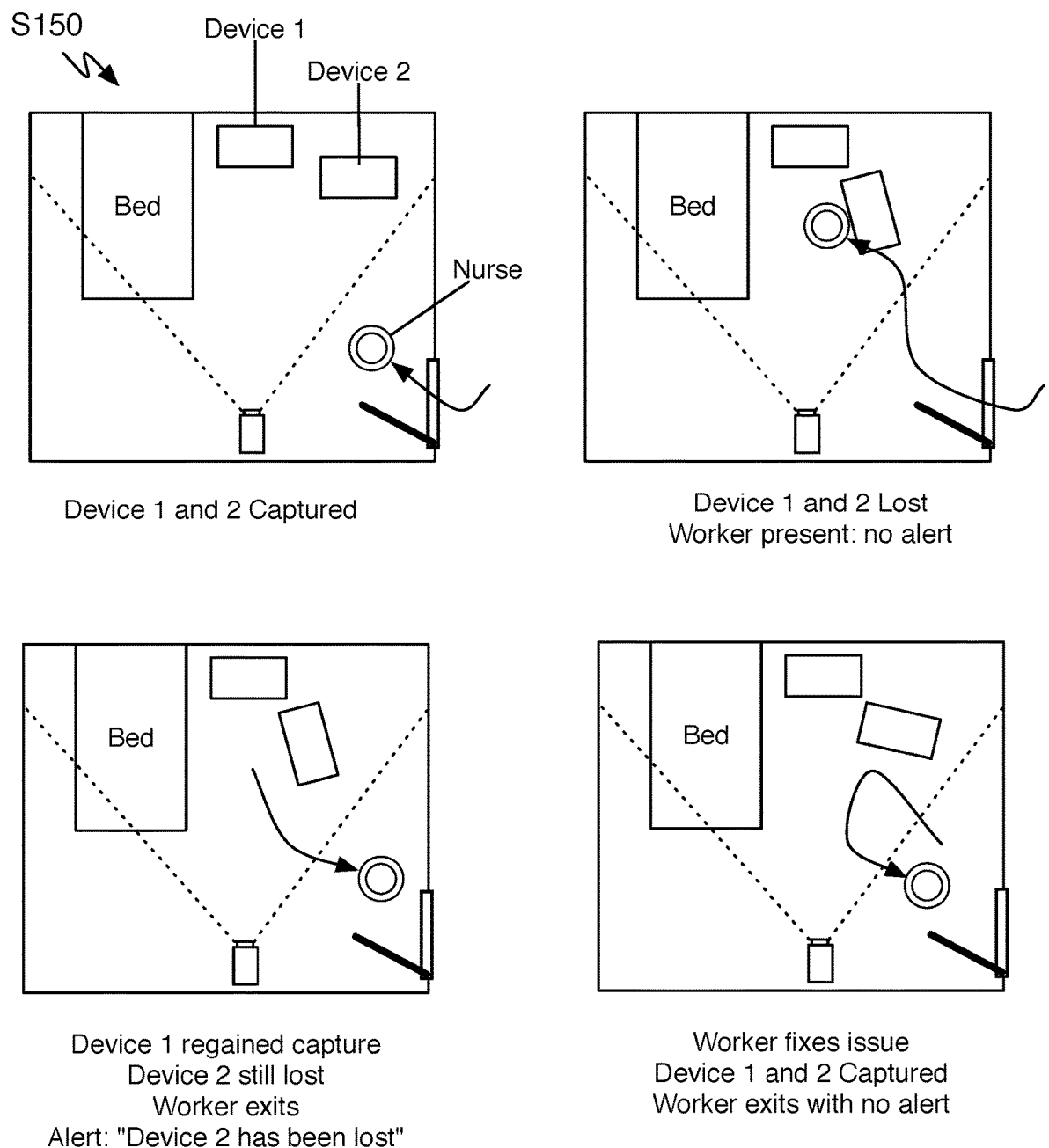
FIG. 29 is an exemplary diagram of generating feedback based on capture status.

As an exemplary scenario shown in FIG. 29, a nurse walks into a patient's room. While the nurse is checking on the patient, they may move a monitor device and/or block the view of the monitor device. During this time the capture status will indicate that data cannot be collected from the device interface source, but user feedback is not generated while the nurse is still helping the patient. When the nurse walks out of the room and is detected to leave the field of view of the image data, an audio announcement could play if the capture state of one or more device interface sources needs adjustments. The nurse will ideally hear and respond to the audio announcement and adjust the various device interface sources or make other adjustments to address the capture state issues.

Feedback may alternatively be generated and associated with data of the extracted interface representations. In cases where a device interface source is lost, the system can accommodate such gaps in information by flagging or annotating data. In some cases, the capture status could be a parameter associated with all extracted data formats. Similarly, the manner in which a device interface source was lost could be classified and used to flag or annotate the data. Classifications for lost device interface sources can include obscured device, lighting conditions, off-angle view, and device interface source disappearance.

To address possible changes in the capture status, the imaging device could be in close proximity to a device interface source to mitigate the chances of an object blocking view of the device interface source. In one variation, the imaging device can be mounted directly to the device interface source such that the relative position and orientation of the imaging device and the device interface source is fixed.

The method was primarily described as involving the use of a single camera of a single device interface source, but the method can be customized to work with multiple imaging devices and/or with multiple device interface sources.

In one variation, multiple imaging devices may be used to collect extracted interface representations of a device interface source. These different imaging devices may be used at distinct times or overlapping times. In one exemplary scenario, image data is captured by at least a first imaging device and a second imaging device; and processing the image data associated with the device interface source into an extracted interface representation can include processing image data collected from the first imaging device at a first instance into an extracted interface representation of the device interface source during the first instance and processing image data collected from the second imaging device at a second instance into an extracted interface representation of the device interface source during the second instance.

The method is preferably operable for use with multiple device interface sources, wherein the method may include setting two or more device interface sources, and for each instance of extraction configuration of a device interface source, processing the image data associated with the respective device interface sources into extracted interface representations according to the respective extraction configuration. The extracted interface representations of the different device interface sources are preferably managed as separate and distinct data feeds (unless configured for merging). The exposed access interface may be used to access the extracted interface representations of select device interface sources or multiple device interface sources.

In one variation of the method, the image data is collected by a movable imaging device. A movable imaging device may be a camera on a smart phone, a tablet computer, a wearable computer such as smart glasses or a body camera, an imaging system of a robot, automobile, or movable machine, or any suitable device that is generally not statically positioned.

The movable cameras will preferably be exposed to many more potential device interface sources. And the method may employ automatic enrollment and configuration of device interface sources to facilitate accommodating the volume of device interface sources to be extracted. In one variation, the device interface sources may be automatically configured on demand in response to some condition. In another variation, the method can include enabling proactive processing of detected device interface sources that are pre-configured with extraction configuration.

Figure 30:
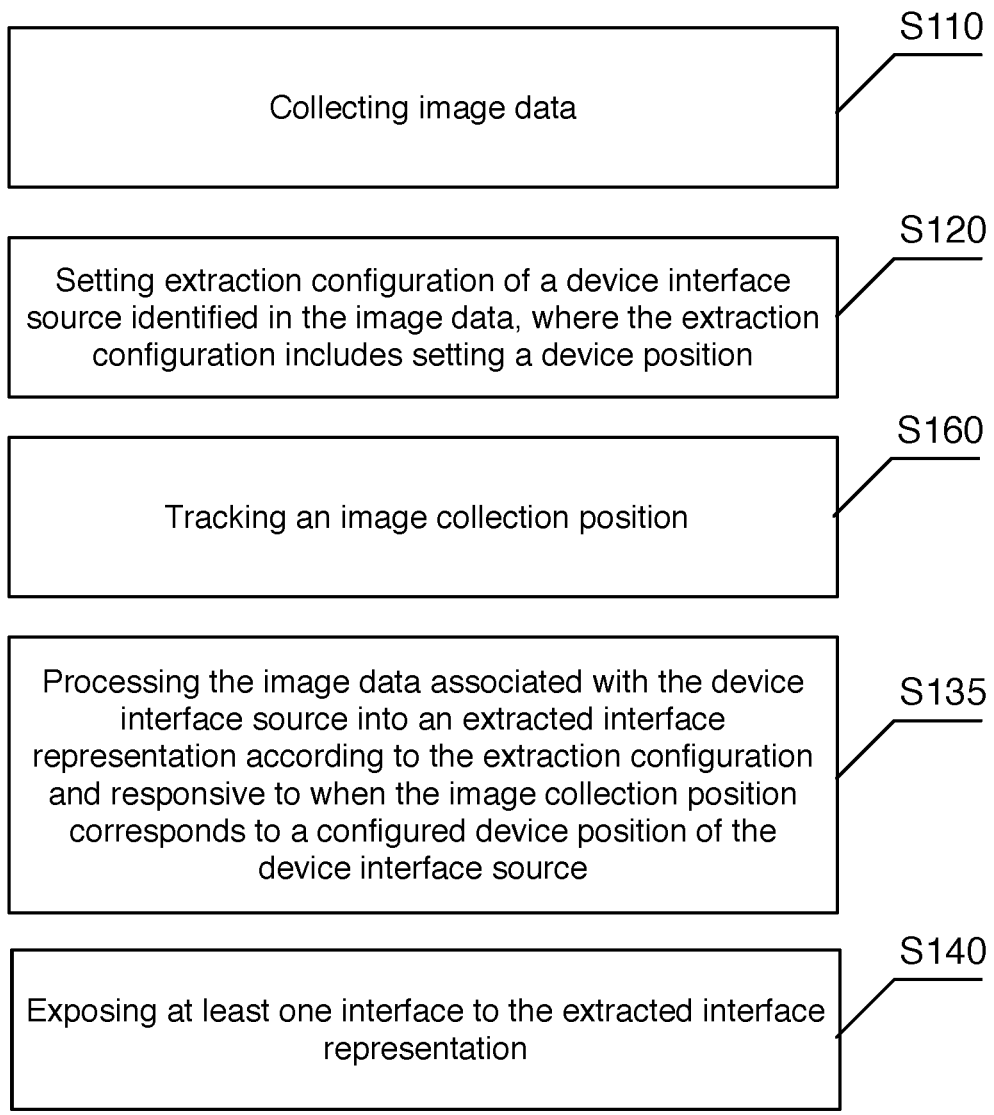
FIG. 30 is a flowchart representation of a variation of the method used with a movable imaging device.

In a movable imaging device variation, the method may include collecting image data S110; setting extraction configuration of a device interface source identified in the image data, where the extraction configuration includes setting a device position S120; tracking an image collection position S160; processing the image data associated with the device interface source into an extracted interface representation according to the extraction configuration and responsive to when the image collection position corresponds to a configured device position of the device interface source S135; and exposing at least one access interface to the extracted interface representation S140 as shown in FIG. 30.

Figure 31:
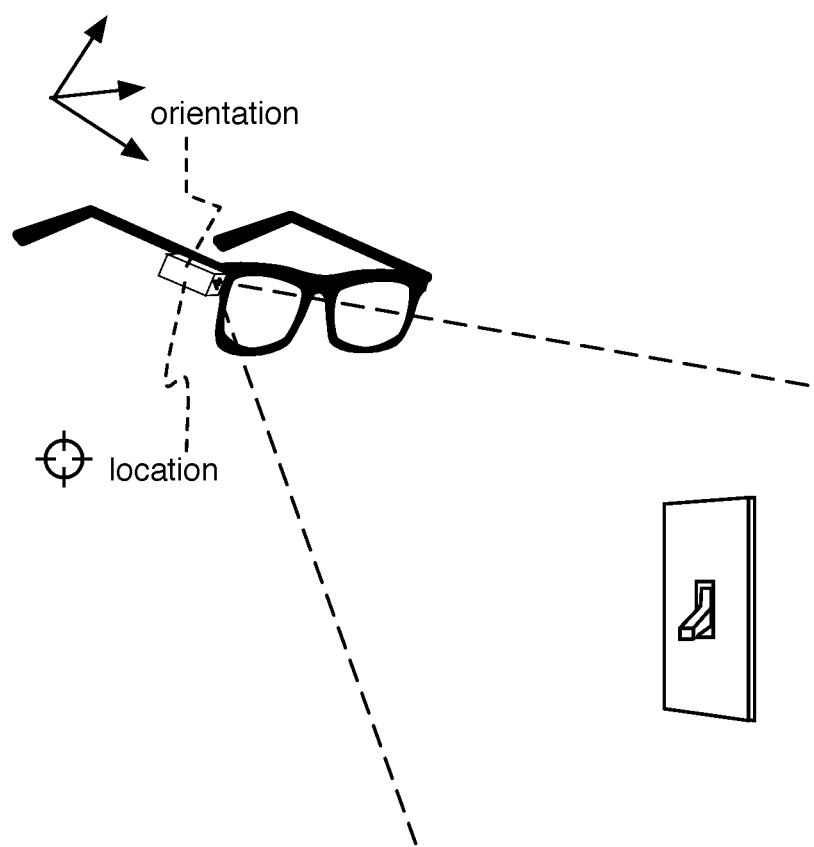
FIG. 31 is a schematic representation of a movable imaging device tracking image collection position.

Block S160, which includes tracking image collection position, functions to detect position and/or orientation within an environment or global setting. In one variation, tracking image collection position includes collecting global positioning coordinates and/or device orientation measurements of the movable imaging device as shown in FIG. 31. In one implementation, the imaging device is integrated into a computing device with a location service that can leverage GPS and/or cellular/Wi-Fi location detection. The computing device may additionally include an inertial measurement unit (IMU), which may include an accelerometer, a gyroscope, and a magnetometer. The IMU may be used to detect the orientation of the imaging device and direction of the imaging device. The image collection position may additionally include determining a spatial estimation of an environment from collected image data. A spatial estimation can use various spatial sensing technology integrated into the computing device, processing multiple images, and/or using other techniques used in generating a spatial map. The spatial map may additionally be used in understanding what is viewable by the movable device at different moments.

Additionally or alternatively, tracking image collection position can include tracking visual mapping of a scene, which functions to use image mapping within a localized area. The image data can be compared to past image data of a device interface source. The visual mapping will signal when similar scenes are detected which can increase the likelihood that the device interface source can be detected. Visual mapping may be activated when GPS indicates approximate proximity to a device interface source.

In one variation, tracking of image collection position can be used in setting the device position during setting of the extraction configuration. During setting of the extraction configuration, positioning of the movable imaging device is preferably used to establish an estimation of the location of a device interface source. GPS and location information can provide rough location. Orientation may provide information such as if the device interface source is located high or low. Spatial estimation can be used to understand from where the device interface source may be viewable.

Tracking of image collection position is additionally used in determining when image data should be processed. The method can search for device interface sources that may be viewable based on the tracked image collection position. It can similarly applied to selectively activate a collection of image data. For example, a device may initiate collection of image data in response to the device position corresponding to a possible device interface source.

In a glasses variation, eye tracking may additionally be used in identifying the object or region of image data viewed by a user. This may be used in directing the processing of image data to generate an extracted interface representation. This may additionally be used in selecting an object for extraction configuration.

The device interface sources may be associated with the device and user, but a shared platform may additionally collect device interface sources so that the network of imaging devices can cooperate in sharing extraction configuration and collection image data and processing image data.

The method may additionally include detecting a candidate device interface source. In one variation, such automatic enrollment and configuration can be performed independent of any configured device position to enable on-demand extraction of data from a device interface source. The method actively captures image data and processes the image data for device interface source detection upon detection. Interface source detection can use CV-based object classification and detection techniques. When a device interface source is detected, it can be processed according to an extraction configuration based the type of device interface source. Without configuring a device position the extracted interface representation may not be part of a larger historical record of the device interface source and instead provide a snapshot for the duration that device interface source was viewable. Alternatively, detection of a candidate device interface source can be used along with setting device position such that a historical record of that device interface source can be generated. Accordingly, the method shown in FIG. 30 can include detecting at least one type of device interface and automatically setting extraction configuration of a device interface upon detection of a type of device interface, wherein the extracting configuration sets device position to map to the image collection position.

The movable camera variation of the method may include the scenario where multiple imaging devices that are operated by different users can collect extracted interface representations of a device interface source at different times. The method may enable sharing of extracted interface representations so that the collaborative collection of imaging data and processing can provide more data points of a device interface source. Sharing can function to share data across accounts and devices. Sharing can be particularly useful for a movable camera, as image data of a device interface source will likely only be periodically processed. Sharing of data and processing may expand the number of opportunities to observe and process a device interface source. For example, a family with sharing of extraction configuration for device interfaces at their home may be able to provide more data on monitored devices. An interface extraction platform in communication with the different imaging devices can preferably coordinate the sharing of image data and/or extracted interface representations.

There may be cases though where one would desire to restrict capabilities to perform interface extraction. The movable camera variation (along with other variations) may enable permissions to augment the sharing of image data and/or extracted interface representations. A policy engine can preferably enable, disable, or regulate processing of image data into extracted interface representations and the accessing of generated extracted interface representations of different devices based on the privileges associated with that account. The interface extraction platform in communication with the devices may be able to remotely enforce the policy engine. Alternatively, the policy engine may have access to a local copy of permissions that can be enforced on-device.

In one variation, imaging devices can be associated with user accounts such that registering of an imaging device can set how permissions are enforced for that imaging device. The user accounts may additionally be used in accessing data or services using the extracted interface representations. Any suitable identity mechanism may be used in place of user accounts. In one instance, a movable camera may be associated with a first account and used in collecting image data that is processed into an extracted interface representation. However, exposing an access interface to the data may permit a second account to access the extracted interface representation and prohibit and/or restrict the first account from reading, accessing, or otherwise using the extracted interface representation.

The permissions can permit, restrict, or otherwise limit the processing of image data into extracted interface representations and/or accessing collected extracted interface representations. Permissions for processing can be used to prevent conversion of image data into an extracted interface representation. Permissions for accessing may be used to allow the collection of image data for processing but then prevent access from particular entities possibly including the user that assisted in collecting and/or processing the image data. In one instance, the permissions can be used to grant one particular type of account permission to facilitate the generation of extracted interface representation data but to prevent access to the data the account generated. In an example of this instance, a first user account is associated with an imaging device and is permitted to access extracted interface representation data for a particular device interface source. In this example, a second user account is associated with a second imaging device may also assist in the generation of extracted interface representation data, but the second user account may be prohibited from accessing the extracted interface representation of the device interface source through an exposed interface.

Permissions can be conditional on associated account, device position, device interface source identity (e.g., a particular device interface source), device interface source type (e.g., a particular type of device source such as a particular type of computing device), time of day, number of data points, and/or other factors. Permissions can be set for specific user accounts or based on properties of user accounts such as group association (e.g., part of a family, friend, or work group), residency, and the like. Position and geographic region may be used in many cases for conditional permissions.

Permissions may be set by administrators of the system. Permissions may alternatively be set by individual users. In one implementation, the method can include granting permission administrator rights to a restricted geographic area to a user account. Accounts could alternatively be granted permission administrator rights over particular device interface source types (e.g., manufacturers of a particular device). Claiming of permission administrator rights preferably includes validating the request to ensure the account should be granted those rights. For example, granting permission administrator rights to a restricted geographic area may depend on proof of residency and/or ownership of that geographic area. In this way, homeowners and/or business owners can restrict and control interface extraction with and/or at their property. In one instance of granting permission administrator rights, the method may include setting regional permissions of extraction configuration to a first account for a first region; wherein setting of the extraction configuration of a device interface source is restricted to configuration by the first account. The first account or set of accounts in this example, is the only one enabled to set extraction configuration for a device interface source in that first region. Alternative instances may allow some limited options of setting extraction configuration. For example, a second user that brings an object already associated with extraction configuration into the first region may still be permitted to manage permissions for that object.

4. System

Figure 32:
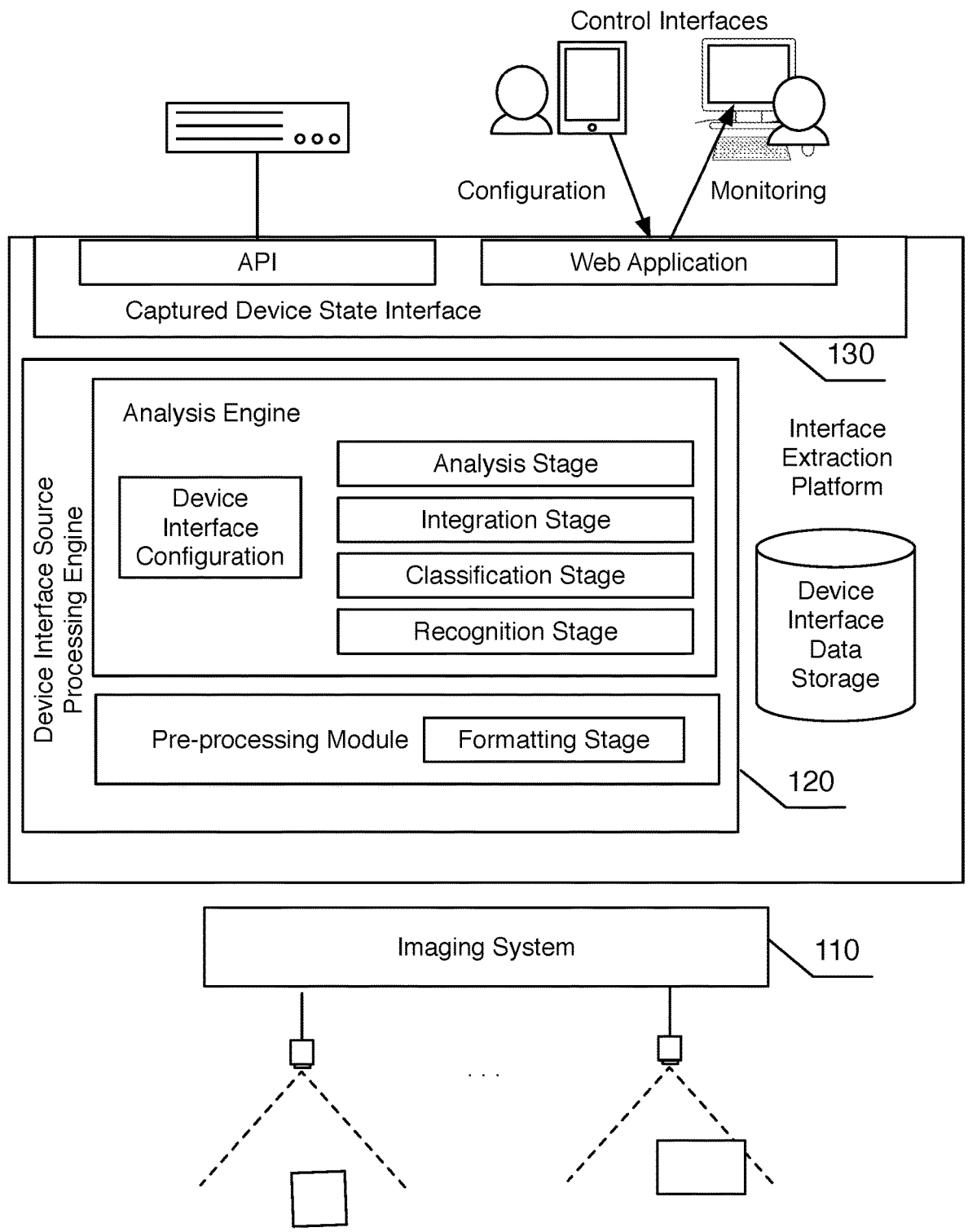
FIG. 32 is a schematic representation of a system of a preferred embodiment.

As shown in FIG. 32, a system for establishing remote integration with a device through a user interface output of a preferred embodiment can include an imaging system 110, a device interface processing engine 120, and an access interface 1300. The interface extraction system is preferably used for extracting user interface outputs of a device that would be available to a user for interpretation and converting the related information to an extracted interface representation for remote access and integration. The device interface source preferably includes a visual interface but may additionally or alternatively have audio-based interface elements. The user interface of a device can be an explicit user interface like a display but may alternatively be an analog user interface like the fluid level in a container (e.g., an I.V. bag level), a knob position, or dial position. The system preferably implements the method described above but may alternatively be used in any suitable manner.

The system can be implemented to monitor a single region. The system may alternatively be implemented to monitor a plurality of distinct regions. For example, a hospital may have multiple imaging systems 110 installed in multiple patient rooms, and the system can facilitate individually monitoring the various device interface sources in the multiple patient rooms.

In one embodiment, the system is implemented within a remote interface extraction platform. The interface extraction platform can integrate with the imaging system 110, include at least a portion of the device interface processing engine 120, and provide one or more access interfaces 130. In one variation, the remote interface extraction platform is a multi-tenant platform wherein multiple different accounts can run distinct instances of the system through the platform. Alternatively, a single-tenant solution could be used in place of a remote interface extraction platform. For example, a server application could act as an on-premise platform. In yet other implementations, a stand-alone imaging device may be designed to include the imaging system 110, device interface processing engine 120, and the capture device state interface.

The imaging system 110 functions to collect media and more preferably the image data that may contain a device interface source. The imaging system 110 can include one or more imaging devices. The image data collected by the imaging system is preferably video but can alternatively be a set of periodic static images. The imaging devices are preferably visual video or still cameras, but may additionally or alternatively collect infrared, depth-based, lidar, radar, sonar, and/or other types of imagery. The imaging system 110 can additionally include a low-light/night mode. For example, an IR illumination system could emit IR light and collect image data from the IR spectrum during low light or nighttime mode. Depth imaging devices, and other suitable forms of imaging devices may additionally or alternatively be used. An imaging device is preferably mounted such that a region of interest is in the field of view of the imaging device. The imaging device can be static such that the field of view is substantially not dynamic. Alternatively, the imaging device could be actuated where the field of view can be changed by rotating, elevating, panning, zooming, moving and/or otherwise altering the field of view. In one variation, the imaging system 110 could include a free moving imaging device (i.e., a movable imaging device) such as one worn by a user. An imaging device is preferably a standalone imaging device with a power source and a network interface (e.g., wired or wireless). Processing may be performed on the imaging device but may alternatively be performed entirely or in part on a remote device. In one variation, the imaging system 110 could be a vision system interface that enables integration with an existing imaging system 110 (e.g., surveillance cameras).

In a variation with a movable imaging device, the imaging device can additionally include or have access to positioning and/or orientation sensing devices such as a location service of a computable device (e.g., using GPS and/or cellular/Wi-Fi location) and/or an IMU (e.g., including a three-axis accelerometer, a three-axis gyroscope, and a magnetometer).

In a variation with an imaging system network, the imaging system 110 can include a multitude of imaging devices distributed in the environment with the imaging devices positioned at a range of distinct vantage points. When installed for enabling interface extraction across an environment, the imaging system 110 may be a high-density imaging system. A high-density imaging system is preferably characterized by a large portion of the relevant portions of environment normally observed by an image capture device. A large portion, in one example, can be characterized as greater than 95% of surface area of interest. High density may additionally be characterized as having redundant coverage. In one example, high density imaging system may be characterized by one camera for every one hundred square feet of surface area of interest (e.g., the ground, product storage faces, etc.). In an environment like a small grocery store this can may be twenty or more cameras distributed for coverage of two thousand square feet of surface area of interest. The imaging device to environment space ratio could be any suitable ratio. The system could alternatively use a sparse network of imaging devices with little or no overlap of fields of view.

The imaging system 110 preferably continuously or periodically collects image data that is processed by the device interface processing engine 120. The imaging system 110 may alternatively be dynamically controlled to collect image data on demand to collect image data for the device interface processing engine. The capture configuration of an imaging device could be statically set but may alternatively be dynamic. Capture configuration can include any suitable imaging setting such as ISO, aperture, shutter speed, zoom, or other settings. The capture configuration could be dynamically altered based on one or more results of the device interface processing engine 120. The capture configuration could additionally operate in alternating capture configurations so as to cycle through camera settings customized for different device interface sources.

Herein, the system is primarily described as it would be used for visual interface extraction. The system could additionally or alternatively utilize one or more microphones to collect audio, vibration, and ultrasonic signals and convert the collected data into an extracted sound-pressure interface representation of the device. The system could additionally or alternatively utilize one or more chemical sensors to collect signals and convert the collected data into extracted chemical interface representations of the device. In an alternative embodiment the system can be implemented with only visual, only microphones, or only chemical sensors, or any combination where interface cues can be collected and processed without other forms data collection.

The device interface processing engine 120 functions to process the image data from the imaging system to extract the state of a device interface source. The device interface processing engine 120 is preferably configured in cooperation with the imaging system 110 to execute the processing of image data into an extracted interface representation described above. In one implementation, the device interface processing engine 120 can include a pre-processing model and/or an analysis engine. The device interface processing engine 120 preferably operates on image data associated with a device interface source. The region of image data associated with a device interface source could be pre-configured but may alternatively be automatically detected.

The pre-processing module functions to transform image data that relates to a device interface source. A cropped copy of image data can be generated for each device interface source. Various visual transformations including geometric transformations and imaging transformations can be applied to the image data within the pre-processing module.

The analysis engine functions to synthesize image data associated with a device interface source into an interpreted representation. There could be multiple stages and processes executed by the analysis engine. The analysis engine preferably operates on the output of the pre-processing module. The analysis engine could facilitate processing a classification stage, an integration stage, and/or one or more higher-level analysis stages. In a classification stage, optical character recognition can be applied on the image data. Image/symbol classification, color detection, audio pattern matching, and/or other forms of classification can be used to generate a parameterized interface representation. A secondary classification stage can operate directly on the parameterized interface representation to interpret the presented information. Additionally, the device state interpreter can be used to interpret the presented information. An integration stage functions to combine multiple pieces of information. The different pieces of information can be retrieved from one or more device interface sources. Various higher-level analysis systems can perform real-time or historical analysis of the generated information. For example, higher-level analysis could analyze all the different meters and initiate an alert.

The access interface 130 functions to offer some form of access to the collected extracted interface representations. The access interface 130 could be a user interface such as a dashboard for accessing and exploring collected data. The access interface 130 could alternatively be a media communication interface such as a formatted video stream or notification/alert system. The access interface 130 could alternatively be a programmatic interface such as an application programming interface (API) or an application processing engine. An API can enable outside applications or services to remotely interact with the collected data. An application processing engine could enable scripts or applications to be processed and executed at least in part by the system. For example, higher-level analysis processes may be designed and configured by a third party.

The system could additionally include a control interface, which functions to enable configuration of the imaging system and/or the device interface processing engine 120. The control interface is preferably a user application operable on a computing device such as a smart phone, a personal computer, a wearable computer, and/or any suitable computing device. When setting up the system for a device interface source, the user can use the control interface to set various configuration options. The user could specify the position of the device interface source within the image data, the type of extraction, set some of the operating properties. In one variation, live image data can be streamed from the imaging system 110 to the control interface so that configuration can be performed and previewed on the current state of the device interface source. Additionally, the control interface may be one user interface for viewing and monitoring extracted interface representations of the device interface source.

The system may additionally include an interface extraction platform that is a network accessible platform or service that can be used to facilitate in the processing and/or management of data.

The interface extraction platform in one implementation can host the device interface processing engine 120 in part or full. A control interface like a user application may have communication access to the interface extraction platform so that processing tasks and/or data can be synchronized between different device instances. APIs, web dashboards, administrator control panels, and/or other forms of access interfaces may be provided through the interface extraction platform. In one variation, extraction configuration and data on the various device interfaces can be stored and managed by the interface extraction platform.

The system may additionally include a policy engine that functions to manage sharing of data and interface extraction capabilities. The permissions that can be set by the policy engine are preferably substantially similar to the ones described above. The policy engine can be integrated into the interface extraction platform but may alternatively operate locally with the device interface processing engine 120.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD, DVD, etc.), hard drives, SSHDs, or any suitable device. The computer-executable component can be a processor, but any suitable hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for establishing uncoupled information extraction from a user interface output comprising:
   collecting image data from a movable imaging device;
   setting extraction configuration of a device interface source identifiable in the image data and associated with a device position;
   tracking image collection position of the movable imaging device;
   when the image collection position corresponds to the device position of the device interface source, processing the image data associated with the device interface source into an extracted interface representation according to the extraction configuration; and
   exposing at least one interface to the extracted interface representation.

2. The method of claim 1, wherein setting the extraction configuration of the device interface source comprises selecting at least one of a set of extraction modes for the at least one device interface source.

3. The method claim 2, wherein the set of extraction modes comprises a physical state detection mode, an indicator detection mode, a dial extraction mode, an alphanumeric character extraction mode, and a presence extraction mode.

4. The method of claim 2, wherein the extraction configuration of the device interface source is a gesture detection configuration, and wherein processing the image data associated with the device interface source comprises detecting at least one type of gesture event in a region specified in the extraction configuration when set in the gesture detection mode.

5. The method of claim 2, wherein the extraction configuration of the device interface source is a device model extraction configuration, and wherein processing the image data associated with the device interface source comprises detecting device state of the device interface source according to a selected device model extraction mode and, in accordance with the device state, extracting a parameterized representation of the device interface source from the image data and characterizing the parameterized representation into a labeled data.

6. The method of claim 1, wherein the extraction configuration of the device interface source is a physical state detection configuration, and wherein processing the image data associated with the device interface source comprises parameterizing the physical state of the device interface source into an extracted interface representation when configured in the physical state detection mode.

7. The method of claim 6, wherein the physical state detection mode is a dial extraction mode, wherein parameterizing visual physical state of the device interface source into an extracted interface representation comprises parameterizing the settings of a one-dimensional dial.

8. The method of claim 6, wherein the physical state detection mode is a switch extraction mode, wherein parameterizing visual physical state of the device interface source into an extracted interface representation comprises parameterizing the mechanical state of a switch with at least two mechanically stable states.

9. The method of claim 6, wherein the physical state detection mode is an indicator detection mode, wherein parameterizing visual physical state of the device interface source into an extracted interface representation comprises parameterizing the illumination state of an indicator signal with at least two illumination states.

10. The method of claim 1, wherein the extraction configuration of the device interface source is a character extraction configuration, and wherein processing the image data associated with the device interface source comprises recognizing visible characters and converting the visible characters into a data format.

11. The method of claim 1, wherein the extraction configuration of the device interface source is a presence detection configuration, and wherein processing the image data associated with the device interface source comprises detecting at least one type of object in a region specified in the extraction configuration when set in the presence detection mode.

12. The method of claim 1, further comprising detecting a type of device interface source in the image data through object recognition, and automatically setting the extraction configuration the detected device interface source according to the type of device interface source.

13. The method of claim 1, wherein setting extraction configuration of at least one device interface source comprises receiving manual configuration input through a coupled management application.

14. The method of claim 1, further comprising providing a visual marker and wherein setting the extraction configuration of the device interface source comprises detecting the visual marker in the image data and setting at least part of the extraction configuration based on properties of the visual marker.

15. The method of claim 1, wherein the image data is captured by at least a first mobile imaging device and a second mobile imaging device; and wherein processing the image data associated with the device interface source into an extracted interface representation further comprises processing image data collected from the first mobile imaging device at a first instance into an extracted interface representation of the device interface source during the first instance and processing image data collected from the second mobile imaging device at a second instance into an extracted interface representation of the device interface source during the second instance.

16. The method of claim 1, wherein tracking image collection position comprises collecting positioning coordinates and a device orientation measurement of the movable imaging device.

17. The method of claim 1, wherein tracking image collection position further comprises tracking visual mapping of a scene.

18. The method of claim 1, wherein the movable imaging device is associated with a first account, and wherein exposing at least one interface to the extracted interface representation permits a second account to access the extracted interface representation and prohibits the first account from reading the extracted interface representation.

19. A non-transitory computer-readable medium storing instructions that, when executed by one or more computer processors of a computing platform, cause the computing platform to:
collecting image data from a movable imaging device;
setting extraction configuration of a device interface source identifiable in the image data and associated with a device position;
tracking image collection position of the movable imaging device;
when the image collection position corresponds to the device position of the device interface source, processing the image data associated with the device interface source into an extracted interface representation according to the extraction configuration; and
exposing at least one interface to the extracted interface representation.

20. A system comprising of:
one or more computer-readable mediums storing instructions that, when executed by the one or more computer processors, cause a computing platform to perform operations comprising:
collecting image data from a movable imaging device;
setting extraction configuration of a device interface source identifiable in the image data and associated with a device position;
tracking image collection position of the movable imaging device;
when the image collection position corresponds to the device position of the device interface source, processing the image data associated with the device interface source into an extracted interface representation according to the extraction configuration; and
exposing at least one interface to the extracted interface representation.

* * * * *